United States Patent [19]

Suzuki et al.

[11] 4,270,852

[45] Jun. 2, 1981

[54] SOUND DEVICE INCORPORATED CAMERA

[75] Inventors: Ryoichi Suzuki, Kawasaki; Isao Harigaya; Takashi Uchiyama, both of Yokohama, all of Japan

[73] Assignee: Canon Kabushiki Kaisha, Tokyo, Japan

[21] Appl. No.: 9,821

[22] Filed: Feb. 6, 1979

[30] Foreign Application Priority Data

Feb. 9, 1978 [JP] Japan ................................. 53-14336
Feb. 16, 1978 [JP] Japan ................................. 53-17215

[51] Int. Cl.³ .................... G03B 17/18; G03B 29/00; G08B 3/10; G08B 23/00
[52] U.S. Cl. ............................. 354/23 D; 354/60 E; 354/75; 354/173; 354/212; 354/289; 340/384 E; 340/519
[58] Field of Search ............... 354/23 D, 60 E, 75, 354/60 L, 76, 289, 53, 217, 218, 173, 212–216; 352/170–172, 5, 25, 27, 29, 92; 179/1 SM, 6 R, 6 E; 340/384 E, 519

[56] References Cited

U.S. PATENT DOCUMENTS

| 3,582,949 | 6/1971 | Forst | 340/519 X |
|---|---|---|---|
| 3,673,332 | 6/1972 | Muller et al. | 179/6 E |
| 3,776,625 | 12/1973 | Fountain | 352/170 |
| 3,879,704 | 4/1975 | Noji | 340/519 X |
| 3,998,045 | 12/1976 | Lester | 179/1 SM X |
| 4,015,237 | 3/1977 | Takatani et al. | 340/519 X |
| 4,051,489 | 9/1977 | Saito et al. | 354/23 D |
| 4,069,397 | 1/1978 | Hashimoto | 179/6 R |
| 4,114,995 | 9/1978 | Stieringer | 354/289 X |
| 4,122,306 | 10/1978 | Friedman et al. | 179/6 R X |

OTHER PUBLICATIONS

"A Special Purpose Processor for Speech Synthesis", 1977 Electro Conference Record, Jonathan Allan and Robert J. Steingart, New York, 19-20, Apr. 1977.

Primary Examiner—L. T. Hix
Assistant Examiner—William B. Perkey
Attorney, Agent, or Firm—Toren, McGeady and Stanger

[57] ABSTRACT

A sound device incorporated camera has an indication signal forming circuit for producing a warning signal, a signal indicative of the fact that the operation of the self-timer is in progress, or the like, and a sound producing device for converting the output signal from said circuit to a sound.

10 Claims, 20 Drawing Figures

FIG.3

| INPUT | | | | | OUTPUT | | | | SOUND |
|---|---|---|---|---|---|---|---|---|---|
| D1 | D2 | D3 | D4 | D5 | A2 | A1 | A0 | Eo | |
| 1 | 0 | 0 | 0 | 0 | 0 | 0 | 1 | 0 | BATTERY |
|   | 1 | 0 | 0 | 0 | 0 | 1 | 0 | 0 | CAP |
|   |   | 1 | 0 | 0 | 0 | 1 | 1 | 0 | UNDER |
|   |   |   | 1 | 0 | 1 | 0 | 0 | 0 | OVER |
|   |   |   |   | 1 | 1 | 0 | 1 | 0 | FILM |

FIG.4

| SOUND | INPUT | | | | | | |
|---|---|---|---|---|---|---|---|
|  | ⑥ | ⑦ | ⑧ | ⑨ | ⑩ | ⑪ | ⑫ |
| ONE | 1 | 0 | 0 | 0 | 0 | 0 | 0 |
| TWO | 0 | 1 | 0 | 0 | 0 | 0 | 0 |
| THREE | 1 | 1 | 0 | 0 | 0 | 0 | 0 |
| FOUR | 0 | 0 | 1 | 0 | 0 | 0 | 0 |
| FIVE | 1 | 0 | 1 | 0 | 0 | 0 | 0 |
| SIX | 0 | 1 | 1 | 0 | 0 | 0 | 0 |
| SEVEN | 1 | 1 | 1 | 0 | 0 | 0 | 0 |
| EIGHT | 0 | 0 | 0 | 1 | 0 | 0 | 0 |
| NINE | 1 | 0 | 0 | 1 | 0 | 0 | 0 |
| TEN | 0 | 1 | 0 | 1 | 0 | 0 | 0 |
| BATTERY | 0 | 0 | 0 | 0 | 1 | 0 | 0 |
| CAP | 0 | 0 | 0 | 0 | 0 | 1 | 0 |
| UNDER | 0 | 0 | 0 | 0 | 1 | 1 | 0 |
| OVER | 0 | 0 | 0 | 0 | 0 | 0 | 1 |
| FILM | 0 | 0 | 0 | 0 | 1 | 0 | 1 |

FIG.9

| 22A | 23B | 24C | 15D | 31E | AA | BB | CC | DD | EE |
|---|---|---|---|---|---|---|---|---|---|
| 0 | 0 | 0 | 0 | 0 | 0 | 0 | 0 | 0 | 0 |
| 0 | 0 | 1 | 0 | 0 | 0 | 0 | 1 | 0 | 0 |
| 0 | 1 | 1 | 0 | 0 | 0 | 1 | 0 | 0 | 0 |
| 1 | 1 | 1 | 0 | 0 | 1 | 0 | 0 | 0 | 0 |
| 0 | 0 | 0 | 1 | 0 | 0 | 0 | 0 | 1 | 0 |
| 0 | 0 | 1 | 1 | 0 | 0 | 0 | 0 | 1 | 0 |
| 0 | 1 | 1 | 1 | 0 | 0 | 0 | 0 | 1 | 0 |
| 1 | 1 | 1 | 1 | 0 | 0 | 0 | 0 | 1 | 0 |
| 0 | 0 | 0 | 0 | 1 | 0 | 0 | 0 | 0 | 1 |
| 0 | 0 | 1 | 0 | 1 | 0 | 0 | 0 | 0 | 1 |
| 0 | 1 | 1 | 0 | 1 | 0 | 0 | 0 | 0 | 1 |
| 1 | 1 | 1 | 0 | 1 | 0 | 0 | 0 | 0 | 1 |
| 0 | 0 | 0 | 1 | 1 | 0 | 0 | 0 | 0 | 1 |
| 0 | 0 | 1 | 1 | 1 | 0 | 0 | 0 | 0 | 1 |
| 0 | 1 | 1 | 1 | 1 | 0 | 0 | 0 | 0 | 1 |
| 1 | 1 | 1 | 1 | 1 | 0 | 0 | 0 | 0 | 1 |

| INPUT DATA | | | | OUTPUT DATA | | |
|---|---|---|---|---|---|---|
| 205 | 217 | 216 | 215 | C204 | C205 | C207 |
| 0 | 0 | 0 | 0 | 1 | 1 | 1 |
| 0 | 1 | 0 | 0 | 0 | 1 | 1 |
| 0 | 1 | 1 | 0 | 0 | 1 | 0 |
| 0 | 1 | 1 | 1 | 0 | 0 | 1 |
| 1 | 0 | 0 | 0 | 1 | 0 | 0 |
| 1 | 1 | 0 | 0 | 1 | 0 | 0 |
| 1 | 1 | 1 | 0 | 1 | 0 | 0 |
| 1 | 1 | 1 | 1 | 1 | 0 | 0 |

F I G.18
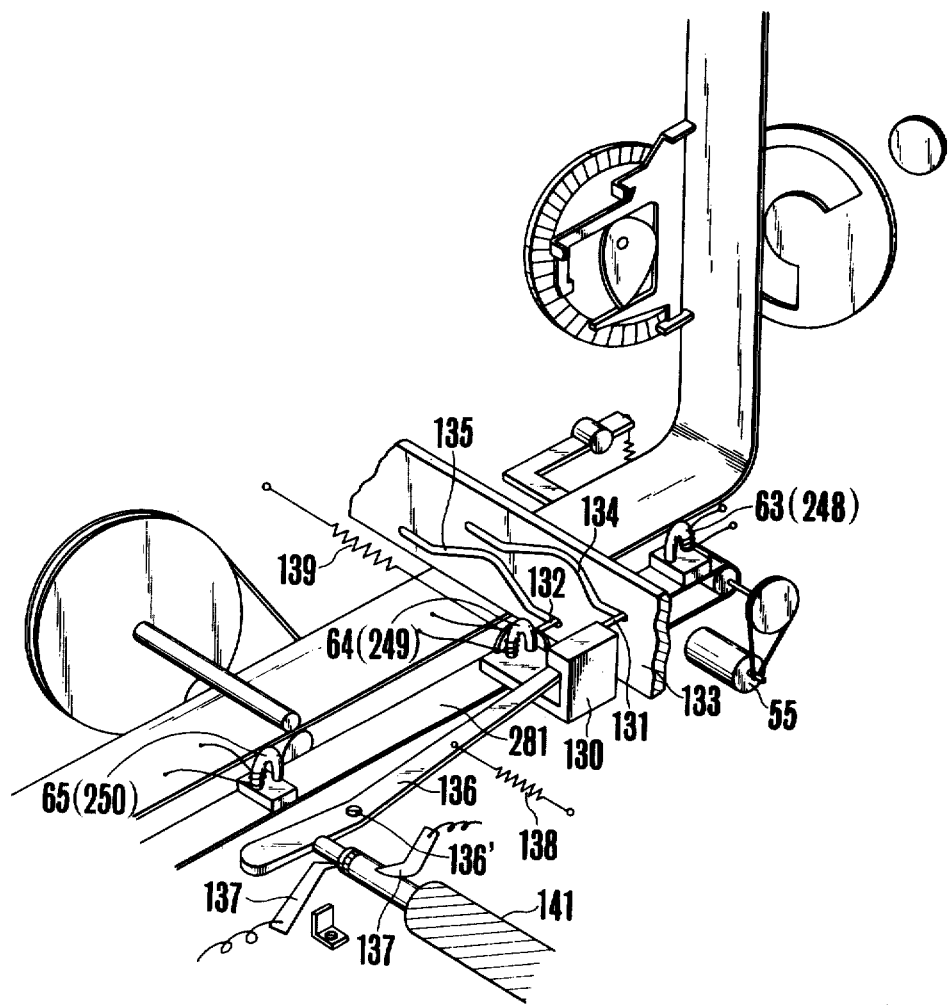

SOUND DEVICE INCORPORATED CAMERA

BACKGROUND OF THE INVENTION

1. Field of the Invention

This invention relates to a camera having incorporated therein a sound producing device for performing various kinds of displays or indications by means of producing sounds.

2. Description of the Prior Art

In conventional cameras, the various kinds of warning displays or indications are visually performed by using a meter needle or light-emitting element positioned within the view finder of the camera. Such visual display method, though being effective for the display of various kinds of warnings for the camera, is not always convenient for the operator whose concentration is directed toward catching an image of a scene to be photographed in the finder and is trying to properly frame the subject. In this situation, he is apt to overlook other things such as a warning display in the finder. Accordingly, many examples of exposure failures will result. For minimizing such failures, various means such as creating an energized display to intermittently flash on and off was utilized, but a warning using only the visual sense is simply not sufficient. For this purpose, it is proposed to employ a warning by the auditory sense in addition thereto. A system for performing the various warning displays in the simple intermittent sound or continuous sound form by a sound producing device (speaker) of extremely thin thickness incorporated in the camera was the basis of a U.S. patent application filed on Aug. 21, 1978 and given Ser. No. 934,723, now abandoned.

In the invention of the above mentioned patent application, the sound from the speaker incorporated within the camera is an intermittent sound or continuous sound of a single frequency. By this sound, it is made possible for the operator who would be otherwise unaware of the visual warning display as he is engaged in aligning the camera with the scene to be photographed to avoid exposure failure, since there is little possibility of missing the sound from the speaker incorporated in the camera when such warning sound arises in the neighbourhood of the operator's ear. However, the warning sound in the invention of the above mentioned patent application is a simple intermittent sound or continuous sound, so that it is difficult to distinctly display different warnings by such sound. Even when the frequency was increased and the intermittency also increased, it was difficult to intuitively discriminate this and to recognize which warning is displayed.

SUMMARY OF THE INVENTION

An object of the present invention is to provide a camera having incorporated therein a device for easily producing many kinds of warnings or indications recognizable by the auditory sense.

Another object of the present invention is to provide a camera having incorporated therein a sound producing device.

Further objects of the present invention will become apparent from the following detailed explanation of the present invention.

BRIEF DESCRIPTION OF THE DRAWINGS

FIG. 3 and FIG. 4 are tables showing input signals corresponding to the individual conditions of the encoder and digital memory in the device of FIG. 1.

FIG. 9 is a table showing input-output relations of the logic circuit in FIG. 6.

FIGS. 17 and 18 are views of the main mechanical parts of a seventh embodiment of the present invention, with FIG. 17 showing the state when in reproduction and FIG. 18 showing the state when in recording.

DESCRIPTION OF THE PREFERRED EMBODIMENTS

Figure 1:
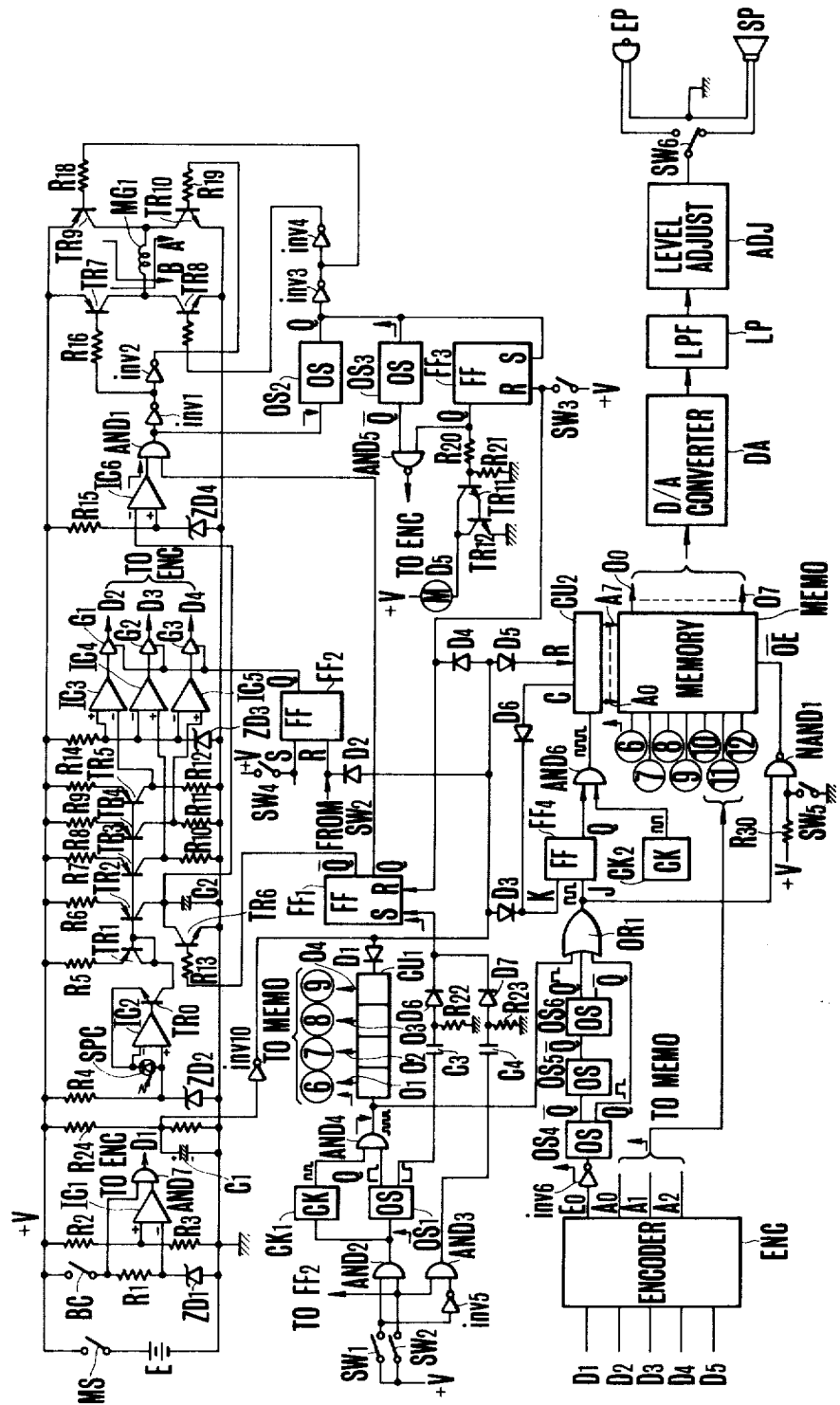
FIG. 1 is a circuit diagram showing one embodiment of a sound producing device incorporated camera according to the present invention.

FIG. 1 shows a circuit diagram of one embodiment of a sound producing device incorporated camera according to the present invention. As a memory medium in the sound producing device of the aforesaid embodiment, use is made of a semiconductor memory, for example, programmable read-only memory (hereinafter referred to as PROM), and in this there are memorized digitized warning or indication signals. The aforesaid embodiment, because of its using no driving means which would be otherwise necessary such as in the magnetic recording system when the recorded information is later reproduced has many advantages. These include the fact that there is no noise produced due to the rotation and the like when in sound reproduction, that there occurs no changes with humidity, temperature and time which are encountered when the magnetic head is used so as to avoid any requirement for remedy for such changes, and that the device can be constructed of extremely small size.

In FIG. 1, E is a battery; MS is a normally open type main switch; BC is a normally open type battery check switch; ZD1 is a Zener diode for applying a reference voltage to an input terminal (−) of an IC1 which will be described later; R1 is a current restricting resistor of ZD1; R2 and R3 are dividing resistors for supplying a voltage to be measured to an input terminal (+) of the IC1; IC1 is a comparator; and AND7 is an AND gate. The above-mentioned BC, R1-R3, ZD1, IC1 and AND7 constitute a battery checking circuit. It is noted that the output terminal of said AND gate AND7 is connected to an input terminal D1 of an encoder ENC which will be described later. R24, R25, C1, and inv10 are elements constituting an auto-clear circuit and functioning to reset all counters and flip-flop circuits (hereinafter referred to as a FF circuit) which will be described later. R4, ZD2, SPC, IC2, TR0 and TR1 to TR5 are elements constituting a light measuring circuit; ZD2 is a Zener diode for supplying a reference voltage to an input terminal (+) of an IC2 which will be described later; R4 is a resistor for restricting current of ZD2; the SPC is a light-receiver for converting the illuminance of an object to be photographed to a voltage; IC2 is an operational amplifier for amplifying the signal produced in the light receiver. R5, TR1 and TR0 are circuit elements for causing a current to flow depending upon the output voltage of the operational amplifier IC2, that is, the illuminance of the object. R6, TR2, C2, R13 and TR6 constitute a timing circuit for determining a shutter time; R7 to R12, and TR3 to TR5 constitute a brightness detecting circuit; TR5 is a transistor for a high brightness detection; TR4 is a transistor for low brightness detection TR3 is a transistor for super-low brightness detection such as when the lens is covered by a cap; ZD3 is a Zener diode for supplying a reference voltage for IC3 to IC5 which will be described later; R14 is a resistor for limiting the current of the ZD3; IC3 to IC5 are comparators for comparing the signals from the above-mentioned TR3 to TR5 with the reference voltage to produce output signals corresponding to the brightness conditions; gate G1 to gate G3 are 3 state gates; R15, ZD4 and IC6 are elements of a comparator circuit for comparing the terminal voltage of the capacitor of the above-mentioned timing circuit with the reference voltage; AND1 is an AND gate; inv1 to inv4 are inverters; TR7 to TR10, R16 to R19 are a driving circuit of an MG1 to be described later; the MG1 is a solenoid for driving a shutter (not shown), for example, electromagnetically driven shutter; OS2 and OS3 are one-shot multivibrator circuits (hereinafter referred to as one-shot circuits); FF3 is an FF circuit; AND5 is an AND gate; R20, R21, TR11 and TR12 are resistors and transistors constituting a driving circuit of a motor M which will be described later; M is a motor for film transportation.

SW1 is a self-timer switch; SW2 is a normally open switch which is closed when a shutter button (not shown) is depressed to a second stage; AND2 is an AND gate whose output becomes a high level (hereinafter abbreviated as "1") when the self-timer switch SW1 is closed and when the second stroke switch SW2 is closed, CK1 is a clock pulse oscillator which oscillates at a frequency of 1 second; OS1 is a one-shot circuit for determining a self-timer period; AND4 is an AND gate for producing a signal from the above-mentioned CK1 when the output of the OS1 is "1"; CU1 is a counter for counting the pulses from the above-mentioned AND4, with its output terminals O1, O2, O3 and O4 being connected to the individual input terminals of a digital memory which will be described later; FF2 is an FF circuit for controlling actuation time of the above-mentioned brightness detecting circuit having a set terminal S connected to a normally open type brightness detection switch SW4 which is closed when a release button (not shown) is depressed to a first position and a reset terminal R connected to the above-mentioned switch SW2. Also, the output terminal Q of this FF circuit is connected to control terminals of the individual gates G1 to G3 as shown in the figure. C3, C4, R22, R23, D6 and D7 are individual elements constituting a trigger circuit, with C3 and C4 being capacitors, R22 and R23 being resistors, and D6 and D7 being diodes; AND3 is an AND gate having an input terminal connected through an inverter inv5 to the above-mentioned switch SW1.

FF1 is a FF circuit which is reset when the switch SW3 is closed and is set when the shutter is opened; ENC is an encoder responsive to a signal arriving at any one of its inputs terminals D1 to D5 for producing a signal in the form of a binary code corresponding to the input signal applied to the above-mentioned input terminals at the output terminals A0 to A2 thereof. Since the aforesaid encoder ENC is known in the art and is sold by Motorola Inc. having a part number MC14532CP or by Texas Instrument Inc. having a part number SN74148N, a further detailed explanation is omitted. OS4 to OS6 are one-shot circuits for determining the timing of production of sounds from a sound producing device which will be described later; OR1 is an OR gate having a first input terminal connected to the above-mentioned AND gate AND4, a second input terminal connected to the one-shot circuit OS6 at its output terminal Q, and a third input terminal connected to the output terminal Q of the one-shot circuit OS4; FF4 is an FF circuit which is reset by a signal from either the above-mentioned auto-clear circuit or the carry terminal C of a CU2 which is described later, and which is set by the output signal of the OR1; CK2 is a clock pulse oscillator for producing clock pulses which advance the counting of the counter CU2 which will be described later, its frequency being determined by taking into account the access time of the memory which will be described later; NAND1 is a NAND gate for sending a control signal to the output enable terminal $\overline{OE}$ of a digital memory MEMO which will be described later; AND6 is an AND gate for transferring the signal from the above-mentioned oscillator CK2 to the counter CU2, which will be described later, only when the output of the FF4 is "1"; SW5 is a switch for stopping the sound.

Figure 2:
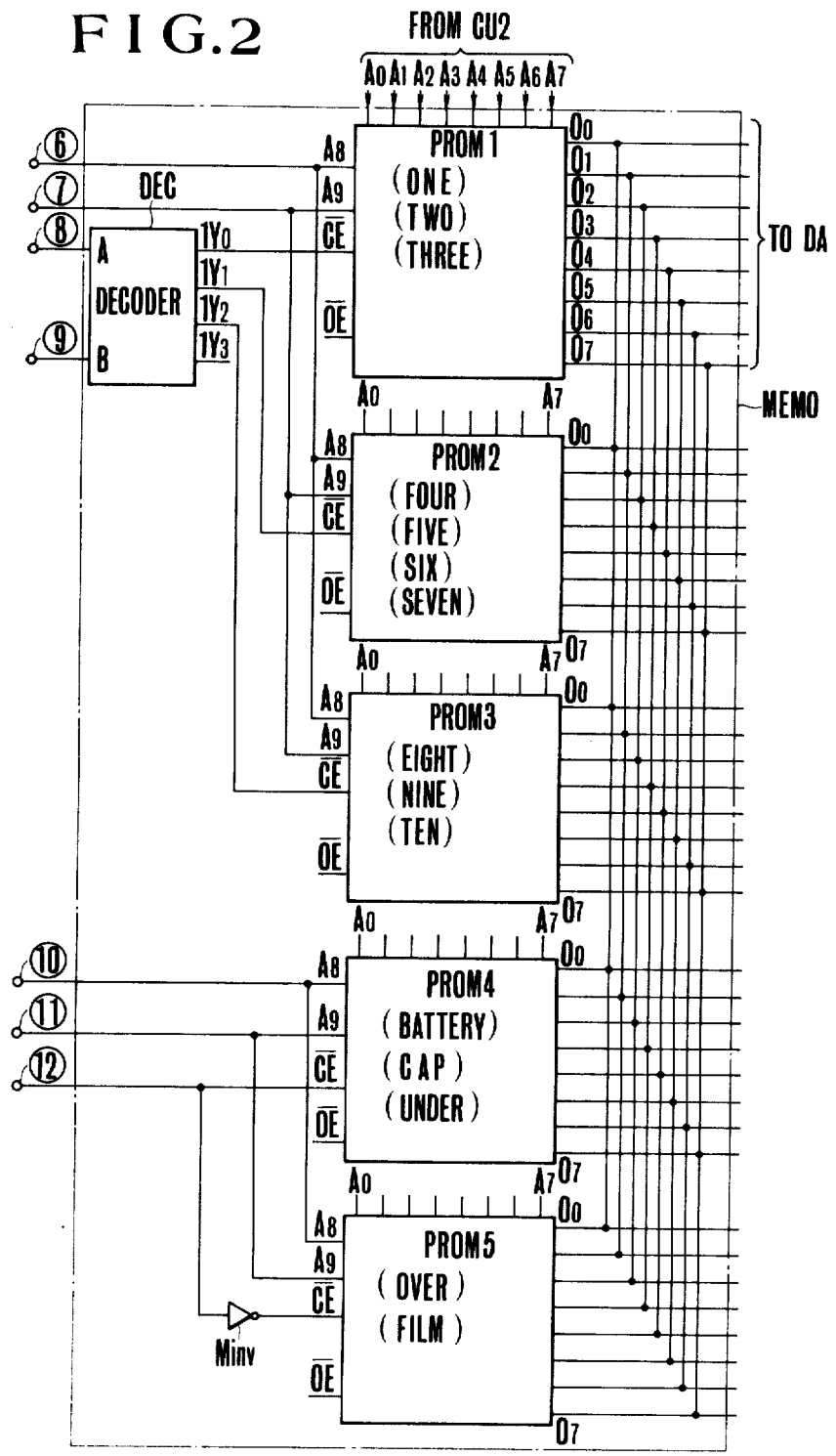
FIG. 2 is a detailed diagram of the memory MEMO of the device of FIG. 1.

CU2 is an 8-bit binary counter for counting the number of pulses from the above-mentioned AND gate AND6 for assigning the line of the digital memory MEMO which will be described later; MEMO is a memory having a construction as shown in FIG. 2 for memorizing digital data corresponding to sounds which will be described later. Explanation concerning FIG. 2 and the details of the memory MEMO will next be made. In FIG. 2, PROM1 to PROM5 are 8192-bit programmable read-only memories (hereinafter referred to as PROM) having address inputs $A_0$ to $A_9$ and data outputs $O_0$ to $O_7$. For such memory, use may be made of INTEL "2758". In each of the above-mentioned PROMs, there are stored digital data corresponding to sounds, which will be described later, in such a manner that the individual rows of the above-mentioned PROM store the various kinds of digital data corresponding to the sounds which will be described later, and its individual lines store 8-bit digital data corresponding to the amplitudes of sounds sampled as the time parameter. DEC is a 2 line-to-4 line decoder of known construction having inputs A and B and outputs $1Y_0$ to $1Y_3$; Minv is an inverter. The address inputs $A_0$ to $A_7$ of the above-mentioned PROM are connected to the individual output terminals of the counter CU2 respectively, and the data outputs $O_0$ to $O_7$ are connected to one another as shown in the figure. Further, the address input $A_8$ of the PROM1 is connected to the address input $A_8$ of the PROM2 and PROM3 and further connected to the least significant bit $O_1$ (hereinafter referred to as LSB) of the above-mentioned counter CU1 through an input terminal (6) of the memory MEMO, and its address input $A_9$ is connected to the address input $A_9$ of the PROM2 and PROM3 and further to the second bit $O_2$ of the counter CU1 through the input terminal (7) of the memory MEMO. Also, the chip enable terminal $\overline{CE}$ of the PROM1 is connected to the output terminal $1Y_0$ of the decoder DEC. The chip enable terminal $\overline{CE}$ of the above-mentioned PROM2 is connected to the output terminal $1Y_1$ of the decoder DEC, and the chip enable terminal $\overline{CE}$ of the above-mentioned PROM3 is connected to the output terminal $1Y_2$ of the decoder DEC. On the other hand, the input (8) of the memory MEMO is connected to the data input A of the decoder DEC, and the input (9) is connected to the address input $A_8$ of the PROM4 and PROM5, and the input (11) is connected to the address input $A_9$ of the PROM4 and PROM5, and the input (12) is connected to the chip enable terminal $\overline{CE}$ of the PROM4 and to the input of the inverter Minv. In each PROM there are memorized digital data corresponding to sounds which are to be produced from a speaker SP to be described later as 8-bit digital signals: the PROM1 memorizes digital data corresponding to sounds, say, "ONE", "TWO" and "THREE", the digital data corresponding to the sound, say, "ONE" being stored in the second row, the digital data corresponding to the sound, say, "TWO" being stored in the third row, and the digital data corresponding to the sound, say, "THREE" being stored in the fourth row; the PROM2 memorizes the digital data corresponding to sounds, say, "FOUR", "FIVE", "SIX" and "SEVEN", the digital data corresponding to the sound, say, "FOUR" being stored in the first row, the digital data corresponding to the sound, say, "FIVE" being stored in the second row, the digital data corresponding to the sound, say, "SIX" being stored in the third row, and the digital data corresponding to the sound, say, "SEVEN" being stored in the fourth row; the PROM3 memorizes the digital data corresponding to sounds "EIGHT", "NINE" and "TEN", the digital data corresponding to the sound, say, "EIGHT" being stored in the first row, the digital data corresponding to the sound, say, "NINE" being stored in the second row, and the digital data corresponding to the sound, say, "TEN" being stored in the third row; the PROM4 stores the digital data corresponding to sounds, say, "BATTERY", "CAP" and "UNDER"; and the PROM5 stores the digital data corresponding to sounds, say, "OVER" and "FILM" in sequence.

The data outputs $O_0$ and $O_7$ of the above-mentioned PROM1 each are connected to a respective input of a digital-to-analogue converter DA shown in FIG. 1. The digital-to-analogue converter DA is a converter consisting of eight resistors which are suitably weighted, and the output terminal of said converter DA is connected through a low pass filter LP and a sound amount adjusting means ADJ to a fixed contact of a change-over switch SW6. One movable contact of the change-over switch SW6 is connected to the speaker SP, and the other movable contact is connected to an earphone EP.

FIG. 3 is a table explaining a relationship between the input signals applied to the inputs D1 to D5 of the priority encoder ENC shown in FIG. 1 and the output signals appearing at the outputs Eo to A2, and another relationship between these output signals and the sounds produced from the above-mentioned speaker SP or earphone EP. FIG. 4 is a table explaining a relationship between the input signals applied to the inputs (6) to (12) of the memory MEMO shown in FIGS. 1 and 2 and the sounds produced from the above-mentioned speaker SP or earphone EP.

Next, the operation of the device of the construction shown in FIGS. 1 and 2 will be described by using FIGS. 3 and 4.

At first, when the main switch MS is closed, the individual circuit portions are supplied with a voltage of the battery E.

Again, before taking photographs, the operator may check the voltage condition of the battery E by closing the switch BC. In other words, when the switch BC is closed, a current is allowed to flow through the resistor R1 to the Zenor diode ZD1. Thus, the reference voltage is supplied to the input terminal $(-)$ of the comparator IC1. On the other hand, applied to the input terminal $(+)$ is an output voltage of the divider of the resistors R2 and R3 for the battery E.

Assuming that the output voltage of the battery E is determined by the resistors R2 and R3 to be lower than the reference voltage, then the output of the comparator IC1 becomes "0". Conversely, when the output voltage of the battery E is higher than the above-mentioned reference voltage, the output of the comparator IC1 becomes "1".

Now suppose that the output voltage of the battery E is higher than the above-mentioned reference voltage, and therefore the output of the comparator IC1 is "1", then the input D1 of the encoder ENC is "1". As is evident from FIG. 3, only the output terminal A0 becomes "1", and the outputs E0, A1 and A2 are simultaneously "0". Therefore, only the input terminal (10) of the memory MEMO becomes "1", while the other input terminals are all "0". Thus, the digital data representing "BATTERY" stored in the second row of the PROM4 are selected.

On the other hand, when the output terminal E0 of the encoder ENC becomes "0" as mentioned above, the one-shot circuit OS4 is triggered through the inverter inv6, and the output terminal Q becomes "1" for a predetermined time, and the output terminals of the gate OR1 and NAND gate NAND1 are also "1" for a predetermined time. For this reason, the data output of the memory MEMO is made possible for a predetermined time determined by the one-shot circuit OS4. Further, when the output of the OR gate OR1 becomes "1" as mentioned above, the FF circuit FF4 is set, and its output terminal Q becomes "1", so that readout pulses are applied from the clock pulse generator CK2 through the AND gate AND6 to the input terminal of the counter CU2. Therefore, the 8-bit digital data corresponding to the sound, say, "BATTERY" stored in the memory MEMO are produced in sequence from the data outputs $O_0$ to $O_7$ of the memory MEMO each time the content of the 8-bit binary counter CU2 changes. The sequential 8-bit digital data produced from the memory MEMO are converted to analogue values in sequence by the digital-to-analogue converter DA, and the high frequency component is removed by the low pass filter LP, and only low frequency sound signal after having been adjusted to a suitable sound amount by the sound amount adjusting means ADJ is applied through the change-over switch SW6 to the speaker SP or earphone EP. Thus, the speaker SP or earphone EP produces the sound, say, "BATTERY" in 256 parts successively. It is noted that the 256 parts of the sound are produced at a high speed in response to the readout signal from the pulse generator CK2, and therefore the photographer can easily recognize the sound as the word "BATTERY".

After the sound, say, "BATTERY" from the speaker SP or earphone EP has been produced, a carry signal is produced from the carry terminal C of the counter CU2 to thereby reset the FF circuit FF4. Thus, the AND gate AND6 is closed. Therefore, since the readout pulse is not applied to the counter CU2, the readout of the digital data stored in the memory MEMO is stopped. However, after about 0.5 (second) has passed from this stoppage, the output terminal of the one-shot circuit OS6 becomes "1" for the predetermined time. By this, the FF circuit FF4 is again set through the OR gate OR1, and the data output of the memory MEMO also becomes possible through the NAND gate NAND1. When the FF circuit FF4 is set, the readout signal is again applied to the counter CU2 through the AND gate AND6, and therefore the digital data corresponding to the sound, say, "BATTERY" stored in the memory MEMO is readout. Thus, the sound, say, "BATTERY" is produced from the speaker SP or earphone EP in a similar manner to the above. In other words, after a time interval of about 0.5 second determined by the one-shot circuits OS4 to OS6, the sound, say, "BATTERY" is produced twice, indicating to the photographer the fact that the output voltage of the battery E is normal.

It is noted that when the switch SW5 is closed, "0" is applied to one input of the NAND gate NAND1, and the output of the NAND gate NAND1 becomes "1". Thus "1" is applied to all the PROMs at the output data terminals $\overline{OE}$ shown in FIG. 2. In this case, therefore, the data outputs of all the PROMs and the production of the sound from the sound producing device SP, EP are inhibited.

Next, the operation with the self-timer will be described. When the self-timer switch SW1 is closed, and when the shutter button (not shown) is depressed from the first position to the second position where the switch SW2 is closed, both of the inputs of the AND gates AND2 become "1", and therefore the output of the AND gate AND2 becomes "1".

On the other hand, the AND gate AND3 is associated with the inverter inv5, so that its inputs become "1" and "0". Thus, the output of the AND gate AND3 becomes "0". By the change of the output of the AND gate AND2 to "1", the one-shot circuit OS1 is actuated to start operation, and, at the same time, the clock pulse oscillator CK1 starts to oscillate at a frequency of 1 second. Only when these two inputs become "1" simultaneously, does the AND gate AND4 produces an output which is "1". When the output of the AND gate AND4 becomes "1" in synchromism with the pulse from the generator CK1, the output terminal O1 of the counter CU1 becomes "1", and only the input (6) of the memory MEMO becomes "1". When "1" is applied to only the input (6) and "0" is applied to the inputs (8) and (9), only the output terminal 1Y0 of the priority decoder DEC becomes "0" so that, of the PROMs, only PROM1 is enabled. Thus, the digital data corresponding to the sound, say, "ONE" stored in the second row of the PROM1 of the memory MEMO is selected.

Further, when the output of the AND gate AND4 becomes "1" as mentioned above, the FF circuit FF4 is set through the OR gate OR1 to open the gate circuit AND6, thereby the readout pulses produced from the generator CK2 are applied to the readout counter CU2. The digital signal corresponding to the above-mentioned sound, say, "ONE" is produced in 8-bits at a time from the outputs $O_0$ to $O_7$ of the memory MEMO in response to the change of the content of the counter CU2, and is applied to the digital-to-analogue converter DA in which it is converted to an analogue value, and therefrom through the low pass filter LP and the sound adjusting means ADJ to either of the speaker SP and the earphone EP by which it is converted to the sound. Thus, soon after the start of an exposure with the self-timer, the sound producing device SP or EP produces a sound, say, "ONE". After 1 (sec.) has passed from the self-timer exposure start, the generator CK1 produces a second pulse, and only the output terminal O2 of the 4-bit binary counter CU1 becomes "1", thereby only the input (7) of the digital memory MEMO is supplied with "1". Thus, the digital data corresponding to a sound, say, "TWO" stored in the third row of the PROM1 are selected. For this reason, in a similar manner to the above, the aforesaid digital data are readout in response to the readout pulses from the generator CK2, and the sound, say, "TWO" is produced from the sound producing device SP or EP.

After that, as the counter CU1 advances one by one, the digital data corresponding to sounds, say, "THREE", "FOUR", "FIVE", "SIX", "SEVEN", "EIGHT", "NINE" and "TEN" are readout successively, thereby the sounds corresponding to the digital data are produced from the sound producing device, informing the photographer of the fact that the self-timer exposure is under progression.

After 10 seconds from the start of the self-timer operation has passed, the one-shot circuit OS1 changes its output $\overline{Q}$ from "0" to "1" at which the differentation circuit composed of the capacitor C3 and resistor R22, and the diode D6 produce a differentiation pulse which is applied to the set terminal S of the FF circuit FF1, thereby the output terminal $\overline{Q}$ is changed from "1" to "0". When the output terminal $\overline{Q}$ is changed to "1", the transistor TR6 controlling the start of operation of the shutter timing circuit is turned off to start charging of the timing capacitor C2. It is noted that the base potential of the transistor TR2 connected to the capacitor C2 depends upon the object brightness as sensed by the photo-sensitive element SPC, and therefore the capacitor C2 is charged with a collector current of the transistor corresponding to the object brightness.

On the other hand, when the output terminal $\overline{Q}$ of the FF circuit FF4 is inverted from "1" to "0", the output terminal Q is simultaneously changed from "0" to "1" at which the AND gate AND1 is opened, causing the transistors TR7 and TR10 to be turned on. For this reason, a current flows through the magnet MG1 in a direction shown by an arrow A to open the shutter (not shown).

As the charging of the capacitor C2 proceeds, when the voltage of the capacitor C2 becomes higher than the reference voltage ZD4, the output of the comparator IC6 becomes from "1" to "0" at which the AND gate AND1 is closed. When the output of the AND gate AND1 becomes "0", the output of the inverter inv1 becomes "1" and the output of the inverter inv2 becomes "0", thereby both transistors TR7 and TR10 are cut off.

On the other hand, the output of the AND gate AND1 actuates the one-shot circuit OS2, so that the output of the inverter inv3 becomes "0" and the output of the inverter inv4 becomes "1", thereby the transistors TR8 and TR9 are rendered conducting. Thus, a current flows through the magnet MG1 in the current path B so that the shutter is closed.

By the output of the circuit OS2 the timer of the one-shot circuit OS3 is actuated to set the flip-flop circuit FF3. During the time when the output of the FF circuit FF3 is "1", the transistors TR11 and TR12 are rendered conducting so that the motor M is driven to rotate. This motor M is a known motor for film transportation. As the motor M is driven, a film (not shown) is transported in a manner known in the art. After the film transportation has been completed, the MD completion switch SW3 is turned on to reset the flip-flop circuit FF3. By this reset signal, the output of the FF circuit FF3 is changed to "0", and the transistors TR11 and TR12 are cut off to stop rotation of the film transportation motor M.

If this film transportation motor M operates for a longer time than the timer time of the one-shot circuit OS3, in other words, when the film is jammed in a known film transporting mechanism (not shown), or when the film is not wound up, the MD completion switch continues to be OFF, the driving time of the motor M becomes longer. At this time, the output of the AND gate AND5 becomes "1". For this reason, the output of this AND gate AND5 is fed to the input terminal D5 of the encoder ENC, and therefore the outputs A0 and A2 of the encoder ENC both become "1" as shown in FIG. 3, while its outputs A1 and E0 become "0". When the output terminals A0, A1 and A2 of the encoder ENC come to have the above-mentioned conditions, the input terminal (10) of the memory MEMO which is connected to the output terminal A0 and the input terminal (12) of the memory MEMO which is connected to the output terminal A2 become "1". Further, the input terminal (11) of the memory MEMO which is connected to the output terminal A1 becomes "0". For this reason, only the chip enable terminal $\overline{CE}$ of the chip PROM5 shown in FIG. 2 becomes "0", and therefore only the chip PROM5 is rendered operative. And, further the chip PROM5 receives "1" at the input terminal A8 and "0" at the input terminal A9, and the individual outputs of the counter CU1 are all "0", so that the digital data corresponding to a sound, say, "FILM" stored in the second row of the chip PROM5 are selected.

Further, when the output terminal Eo of the encoder ENC is inverted to "0" as mentioned before, the FF circuit FF4 is set through the one-shot circuits OS4, OS5 and OS6 and the OR gate OR1, and the AND gate AND6 is opened to apply the pulses from the clock pulse generator CK2 to the counter CU2. Thus, the 8-bit digital signal corresponding to the sound, say, "FILM" is successively produced from the output terminals $O_0$ to $O_7$ of the memory MEMO.

For this reason, the sound, say, "FILM" is produced through the D/A converter DA, low pass filter LP, sound amount adjusting means ADJ and speaker SP, warning about the abnormal operation of the film winding up.

Next, the operation for indicating the object brightness will be described. In the time when light is measured, a current corresponding to the brightness of an object to be photographed flows through R5, TR1, TR0, SPC and ZD2, and this current also flows to the transistors TR2 to TR5 in a similar manner. The currents of TR3 to TR5 flow to R10, R11 and R12, with the respective voltage drops being used in discriminating the brightness conditions of the object.

The voltage drops produced by current flowing through the respective resistors R10 and R12 are compared with the reference voltage produced by the Zenor diode ZD3 by the comparators IC3, IC4 and IC5 to perform the above-mentioned discrimination, and the timing of these signals as produced from the GATE1 to GATE3 is controlled by the flip-flop circuit FF2. In the camera provided with the lens shutter, the photographer often intends to make an exposure with the cap left attached to the lens. In such extremely low brightness, currents flowing through R10, R11 and R12 are extremely weak, and therefore the voltage drops produced thereby are also small. Therefore, these are, of course, smaller than the reference voltage, so that the output of IC3 is "1", and the outputs of IC4 and IC5 are "0". In this state, when the shutter button (not shown) is depressed to the first position, the first stroke switch SW4 is closed, and a signal is applied to the S terminal of the flip-flop circuit FF2, and FF2 is set. By this, the output Q of FF2 becomes "1" at which the gates GATE G1 to GATE G3 are opened, and the input terminals D1 to D5 of the encoder becomes "1", "1", "0", "0" and "0" respectively, and the outputs A0, A1 and A2 of the encoder ENC become "0", "1" and "0" respectively. Since the third row of the chip PROM4 in the digital memory MEMO stores the digital data of the wave of the sound, say, "CAP", the speaker SP or earphone EP produces the sound, say, "CAP" in a similar manner to the above.

Next, in the case where the brightness of the object to be photographed is low, there is a larger current than in the above-mentioned case where the cap is attached to the lens, and the voltage drop of R10 becomes higher than the reference voltage. Therefore, the outputs of the gate G1 and gate G2 both become "1", and only the output of the gate G3 becomes "0". Similarly in the case where the brightness of the object to be photographed is high, all the voltage drops of R10, R11 and R12 become higher than the reference voltage. Therefore, only the gate G1 is at "0" level, and the gate G2 and gate G3 are at "1" level. Thus, in response to the object brightnesses, there are produced the sounds, say, "CAP", "UNDER" and "OVER" from the speaker SP or earphone EP in a similar manner to the above.

Figure 5:
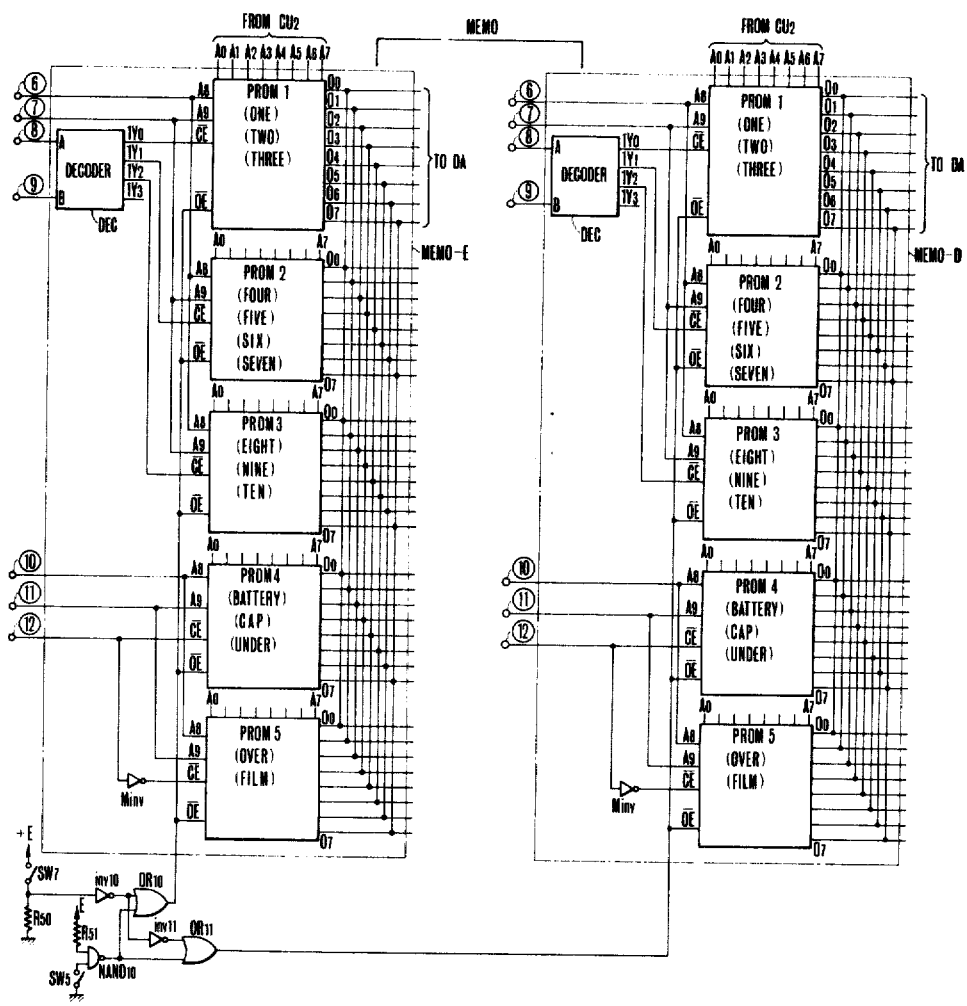
FIG. 5 is a circuit diagram of a portion of a second embodiment of a sound producing device incorporated camera according to the present invention.

FIG. 5 is a circuit diagram of a second embodiment of the present invention where the various kinds of warnings can be made possible in English and German. The construction of the device of the aforesaid second embodiment is almost the same as that shown in FIG. 1, and only the construction of the memory MEMO and a control circuit therefor are different therefrom, so that in FIG. 5 there are shown only the memory MEMO and the control circuit therefor, and the other circuit portions are omitted.

In FIG. 5, R50 is a resistor connected through a switch SW7 to a positive line V, one end of said resistor R50 being connected through an inverter inv10 and OR gate OR10 to the output enable terminal $\overline{OE}$ of the memory MEMO-E; the SW7 is a switch for changing over the languages to be produced from the sound producing device, whereby when English is selected as the language, the switch SW7 is closed, and when German is selected as the language, it is opened; NAND10 is a NAND gate having a first input terminal connected through a resistor R51 to the positive line V and having a second input terminal connected through the above-mentioned switch SW5 to the circuit ground; inv11 is an inverter; OR11 is an OR gate, the output of the OR gate OR11 being connected to the output enable terminal $\overline{OE}$ of the memory MEMO-D; the above-mentioned memory MEMO-E is a memory in which the digital data corresponding to warning sounds in English are stored, its construction being the same as that shown in FIG. 2 so that the explanation thereof is omitted; the above-mentioned memory MEMO-D is a memory in which the digital data corresponding to warning sounds in German are stored, the construction of said memory also being the same as that shown in FIG. 2 so that the detailed explanation thereof is omitted.

Next, the operation of the second embodiment shown in FIG. 5 will be explained.

At first, when English is selected as the indication sound by closing the switch SW7, the output of the inverter inv10 becomes "0", the output enable terminals $\overline{OE}$ of all the PROMs of the memory MEMO-E become "0", thereby the memory MEMO-E is rendered operative. On the other hand, when the output of the inverter inv11 is changed to "1" by the closure of the above-mentioned switch SW7, the output enable terminals $\overline{OE}$ of all the PROMs in the memory MEMO-D become "1", thereby the memory MEMO-D is rendered inoperative. Therefore, when an indication signal such as BATTERY, FILM or the like is given to the input terminals (6) to (12) of the memory MEMO-E, a digital signal corresponding to that indication signal is produced from the output terminals $O_0$ to $O_7$ of the memory MEMO-E, presenting to the photographer an indication such as BATTERY, FILM or the like in English.

Figure 6:
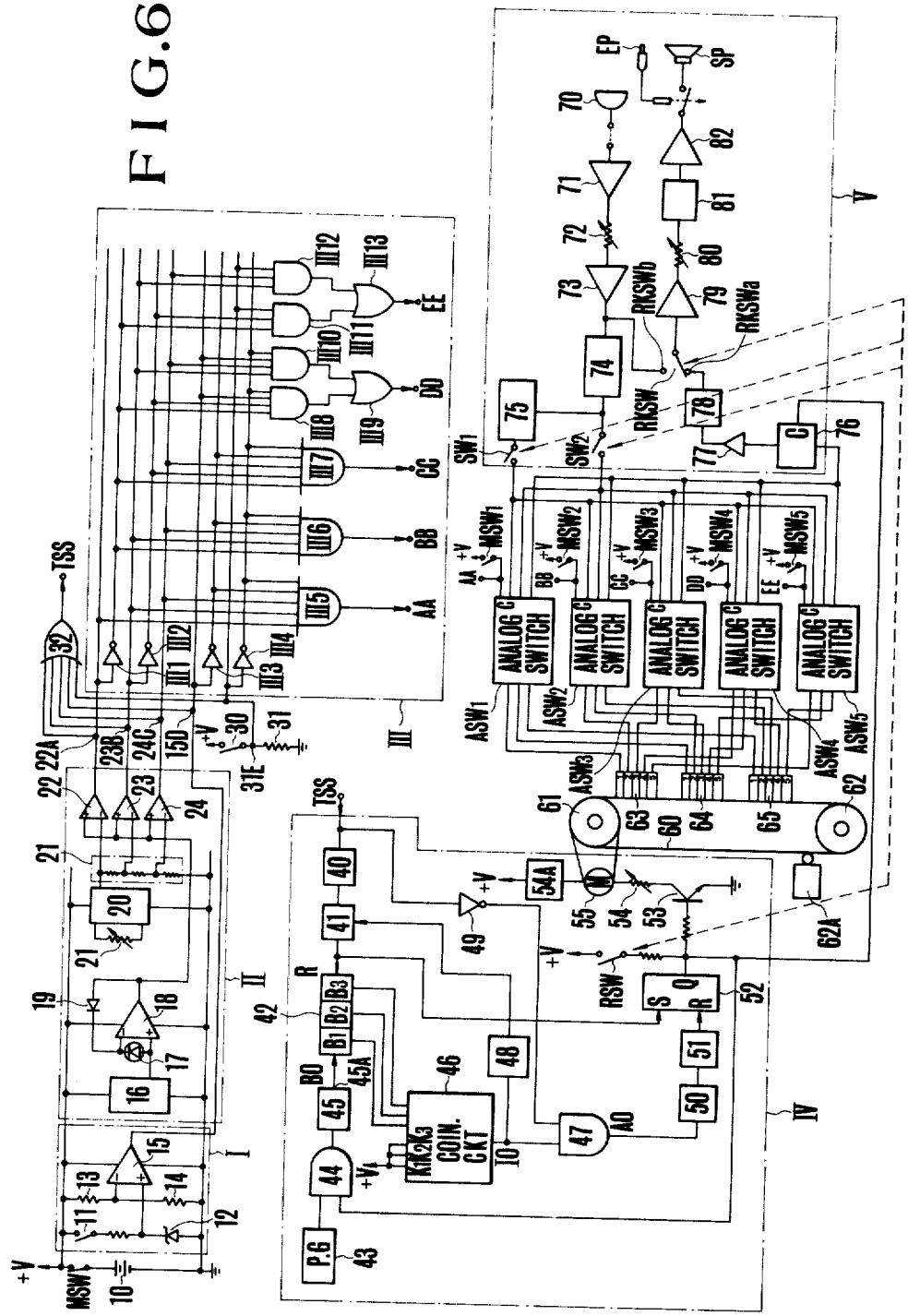
FIG. 6 is a circuit diagram of a third embodiment of the present invention.

FIG. 6 shows a third embodiment of the present invention where a multi-channel endless tape is used as the memory.

In FIG. 6, a block I enclosed by dashed lines is a battery checking circuit; II is an exposure warning signal forming circuit for high brightness, proper brightness and low brightness; III is a logic circuit for selection of a magnetic head corresponding to an individual signal; IV is an endless tape driving circuit; and V is a sound recording and reproducing circuit. It is noted that the present embodiment is described in connection with a case where the device of the invention is incorporated in a diaphragm priority automatic exposure control camera.

In the following, the construction of various circuit portions will be explained in detail. In the battery checking circuit I, 11 is a normally open switch which is closed in cooperation with a battery check button (not shown); 12 is a Zener diode for setting a reference voltage; 13 and 14 are resistors for dividing the voltage of a battery 10 which will be described later; 15 is a comparing circuit, the output of said comparing circuit producing a signal of what is called "1" when the voltage of the battery 10 is lower than the reference voltage.

In the following, the logic high level will be hereinafter referred to as "1", and the logic low level as "0".

In the exposure warning signal forming circuit II, 16 is a reference voltage source; 17 is a photo-electric element for light measurement (for example, silicon photo-cell); 18 is an operational amplifier for amplifying the output of the above-mentioned photo-electric element; 19 is a diode for logarithmically compressing the short-current produced from the above-mentioned photo-electric element 17; 20 is a reference voltage source; 21 is an information input variable resistor for electrically supplying information of film speed value and an aperture size value, the output of the above-mentioned reference voltage source being varied by the set value of said information input variable resistor 21.

22, 23 and 24 are comparing circuits, at the reference level of each of which there is given a voltage obtained by dividing the output of the above-mentioned reference voltage source 20 by the resistor portion 21, thereby the output levels of the above-mentioned comparing circuits 22, 23 and 24 are caused respectively to produce signals [1,1,1], [0,1,1] and [0,0,1] when the brightness is high, proper and low.

30 is a normally open switch which is closed for a predetermined time just before the termination of operation of the self-timer. Said switch 30 may be arranged to be closed when a film cartridge is unloaded in the camera body. The construction of this switch will be described in detail in connection with FIGS. 7 and 8.

32 is an OR gate responsive to at least one of the above-mentioned various kinds of warning signals for producing a tape start signal TSS.

The logic circuit III produces digital signals as shown in the truth table of FIG. 9. It is noted that the left-hand half section of the table is signals applied to the input terminals of the circuit II, while the right-hand half section is signals produced from the output terminals of the circuit II.

As is understood from this truth table, since a great number of warning or indicating signals may occur simultaneously, the circuit of the present embodiment is constructed by taking into account the order of priority. In other words, the order of priority for the signals is as follows: (1) The display of the self-timer or of whether or not the film is present; (2) The battery warning display; (3) The high brightness warning display, (4) The proper display; and (5) The low brightness warning display.

In the endless tape driving circuit IV, 40 is a differentation circuit of known construction; 41 is a monostable multivibrator connected to the output terminal of said differentiation circuit 40, 42 is a 3-bit counter; 43 is a clock pulse generating circuit; 44 is an AND gate; 45 is a frequency divider; 46 is a coincidence circuit of known construction including EXCLUSIVE OR gates for sensing coincidence of the outputs of the individual bits B1, B2 and B3 of the above-mentioned counter 42 with input signals applied to the input terminals K1, K2 and K3, the above-mentioned input terminals K1, K2 and K3 being always "1" as is evident from the figure. In other words, when the individual bits B1, B2 and B3 of the counter 42 produce "1" outputs, the output of the above-mentioned coincidence circuit 46 becomes "1".

48 is a differentiation circuit; 47 is an AND gate; 49 is an inverter; 50 is a differentiation circuit; 51 is a monostable multivibrator; 52 is a flip-flop circuit; 53 is a transistor for driving a motor 55 for driving the endless tape; 54 is a variable resistor for adjusting the current value flowing through said driving motor 55; 54A is a constant voltage circuit provided for the purpose of preventing the current value flowing through the motor 55 from being changed when the voltage of the battery 10 is changed. Further, RSW is a sound recording switch which is closed during sound recording.

The endless tape driving circuit of such construction as described above functions to always stop the endless tape only when it comes to the start position.

61 and 62 are rollers for rotation of the endless tape; 60 is an endless tape; 63, 64 and 65 are respectively 5-channel erasing, sound recording and reproducing magnetic heads; and ASW1 to ASW5 are channel selection analogue switches.

Each of said analogue switches is formed with three analogue switch elements of known construction. MSW1 to MSW5 are normally open switches which are closed by the photographer when in sound recording, said switch MSW1 being connected to the output terminal AA of the above-mentioned logic circuit III and to the control electrodes of the three analogue switch elements (not shown) of the above-mentioned analogue switch ASW1, the switch MSW2 being connected to the output terminal BB of the above-mentioned logic circuit III and to the control electrodes of the three analogue switch elements (not shown) of the above-mentioned analogue switch ASW2, the switch MSW3 being connected to the output terminal CC of the above-mentioned logic circuit III and to the control electrodes of the three analogue switches (not shown) of the above-mentioned analogue switches ASW3, the switch MSW4 being connected to the output terminal DD of the above-mentioned logic circuit III and to the control electrodes of the three analogue switch elements (not shown) of the above-mentioned analogue switch ASW4, and the switch MSW5 being connected to the output terminal EE of the above-mentioned logic circuit III and to the control electrodes of the three analogue switch elements (not shown) of the above-mentioned analogue switch ASW5.

In the sound recording and reproducing circuit V, 70 is a microphone for sound recording with a wire terminating at a plug attachable to a jack in the camera body; 71 is an amplifier; 72 is a sound volume adjuster; 73 is an amplifier; 74 is an equalizer; 75 is a high frequency wave oscillator for bias; 76 is an analogue switch of such known construction as the above which is controlled by the output of an RS flip-flop circuit 52 in the above-mentioned endless tape driving circuit IV; 77 is an amplifier, 78 is an equalizer; RKSW is a change-over switch for recording-reproducing, whereby when in normal position, it is connected to a fixed contact RKSWa side, but when the above-mentioned sound recording switch RSW is closed at the time of recording, it is changed over to a fixed contact RKSWb side so that the sound when in recording can be monitored; 79 is an amplifier; 80 is a sound volume adjusting variable resistor; 81 is a sound quality adjuster; 82 is an amplifier; SP is a speaker for reproduction arranged, for example, on the back cover within the camera body; EP is an earphone, whereby when said earphone is connected to the camera body, the speaker SP is disconnected; and SW1 and SW2 are erasing and sound recording switches respectively which are closed in response to the above-mentioned switch RSW.

Next, the operation of the present embodiment of such construction as the above will be explained. Here, discussion is made regarding the case occurring such that, upon the battery checking operation being performed, it is found that the voltage of the battery is lowered.

At first, the main switch MSW of FIG. 6 is closed and held in, and then the battery check button 11 is closed. When the voltage of the battery is lowered, the level of the inversion input terminal (−) of the operational amplifier 15 constituting the comparing circuit is lowered below the reference voltage of the Zenor diode 12, and therefore the output 15D of the above-mentioned operational amplifier 15 becomes "1". Now assuming that the output terminal 31E of the resistor 31 is at "0" level, then from the explanation diagram of FIG. 9, only the output terminal DD of the OR gate III9 of the logic circuit III becomes "1", the other outputs being "0". Further when this output terminal DD becomes "1", the output TSS of the OR gate 32 also becomes "1". This endless tape start signal TSS is fed to the differentiation circuit 40 in the endless tape driving circuit IV, thereupon the mono-stable multivibrator 41 is actuated by the output of the differentiation circuit 40 to reset the counter 42. Further this output of the mono-stable multivibrator 41 causes the RS flip-flop circuit 52 to be set with its output terminal Q becoming "1" to render the npn transistor 53 conducting. Thus the motor 55 starts to rotate and the endless tape 60 starts to move.

At this time, when the output terminal Q of the above-mentioned RS flip-flop circuit has become "1", the analogue switch 76 in the sound recording and reproducing circuit V is turned on, thereby a reproducing operation is made possible. In this state, as has been mentioned above, since only the output terminal DD of the logic circuit III is "1", the analogue switch ASW4 is turned on, causing the sound signal in the fourth channel of the reproducing magnetic head 65 to be fed through the analogue switch ASW4 and 76 to the reproduction amplifier 77 and therefrom to the speaker SP by which that sound signal is produced as the sound. If a sound, say, "BATTERY RAN OUT" is previously recorded in the fourth channel of the endless tape 60, the speaker SP reproduces that sound which can be heard by the photographer.

On the other hand, when the above-mentioned RS flip-flop circuit changes its output Q to "1" and therefore when the motor 55 starts to rotate, the AND gate AND44 is opened thereby the clock signal from the clock pulse generator circuit 43 is fed to the frequency divider 45 with its divided output OB being counted by the counter 42. When all the bits B1, B2 and B3 of said counter 42 become "1", the output IO of the coincidence circuit 46 becomes "1". By this output IO, the differentiation circuit 48 is caused to produce an output which is applied to the mono-stable multivibrator 41. Thus, the counter 42 is again reset and the output of the coincidence circuit 46 becomes "0". As shown in the timing chart of FIG. 10, therefore, the coincidence circuit 46 produces one pulse at its output IO for every seven pulses from the output BO of the frequency divider.

The above-mentioned motor current adjusting variable resistor 54 is pre-adjusted to such a value that the endless tape 60 rotates exactly one revolution during one cycle of the output IO of the coincidence circuit 46.

Figure 10:
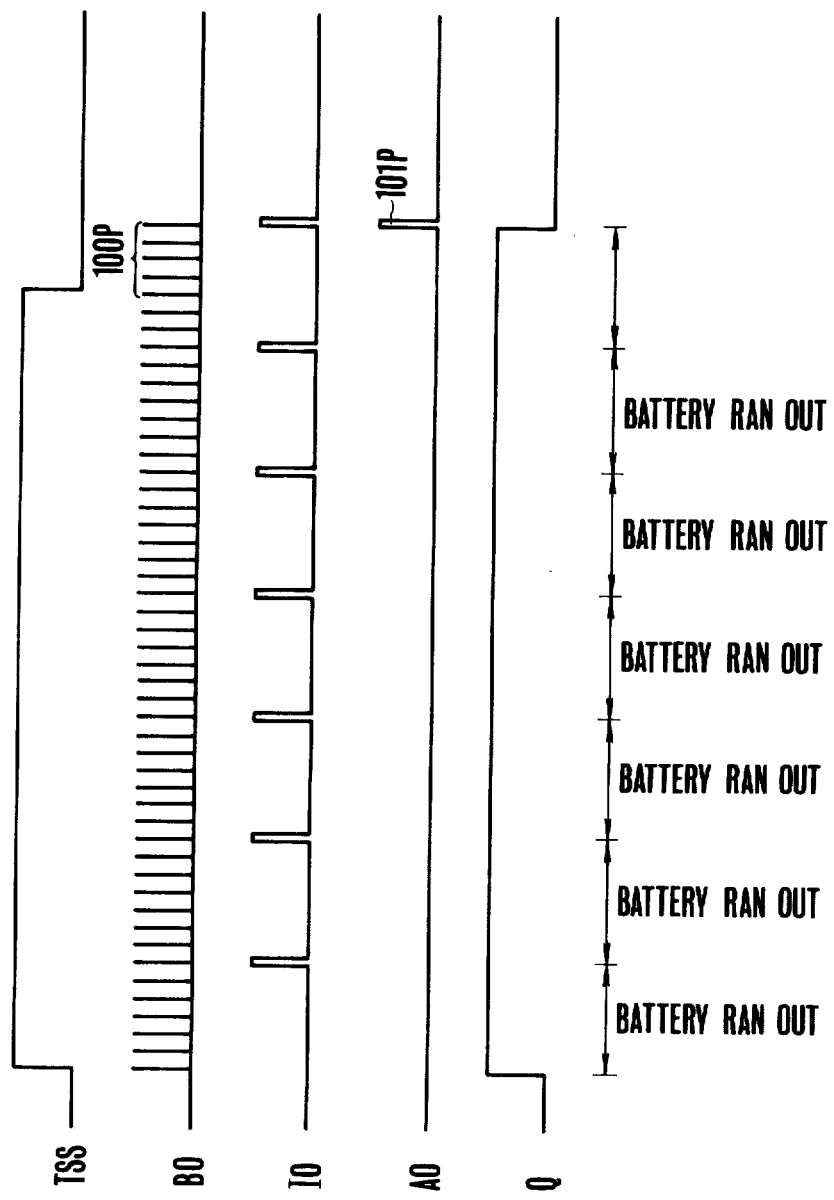
FIG. 10 is a waveform diagram showing an example of a timing chart of signals at various portions in FIG. 6.

During the time when the battery check button continues to be depressed to close the switch 11 and when the tape start signal TSS is produced, as shown in FIG. 10, the output AO of the AND gate 47 continues to hold "0", and therefore, the RS flip-flop circuit is not reset. Next, even when the battery check button is freed to cause disappearance of the tape start signal TSS, the output terminal Q of the RS flip-flop circuit 52 holds "1", so that as shown by 100P in FIG. 10, pulses BO continue to be produced from the output terminal 45A of the frequency divider 45.

When the signal TSS becomes "0", the output terminal of the inverter 49 becomes "1". After that, when the output IO of the coincidence circuit 46 has become "1", that is, when the tape 60 has returned to the start position, a pulse 101P in FIG. 10 is produced from the output terminal of the AND gate 47. By said pulse output 101P, the differentiation circuit 50 is caused to produce an output which is applied to the mono-stable multivibrator 51, thereby the RS flip-flop circuit 52 is reset with its output terminal Q becoming "0". Therefore, the transistor 53 is turned off and the motor 55 stops, and the endless tape 60 stops from further movement. At the same time, the analogue switch 76 in the sound recording and reproducing circuit V is turned off, and the reproducing operation also stops. Further, at the same time, the AND gate 44 in the endless tape driving circuit IV is closed to interrupt the application of the frequency divided output BO to the counter 42.

As is evident from the foregoing, according to this embodiment of the invention, there is provided a timing circuit 42 to 46 which starts to operate in synchronism with the start of the tape 60 and which produce a timing signal IO just when the transportation of the recording band of the tape 60 terminates completely regardless of the fact that the tape start signal TSS becomes "0" at an intermediate point in time during one revolution of the endless tape 60. Accordingly, at this intermediate time point there is no possibility of occurrence of a phenomenon that the motor 55 stops, and the analogue switch 76 also opens to interrupt the sound reproduction, and therefore it is insured that the endless tape 60 stops after it has come around to the start position and the sound reproducing operation continues to be effective until this time.

Next, the sound recording operation will be explained. At this time, the photographer will at first connect the microphone 70 to the input terminal of the amplifier 71 in the sound recording and reproducing circuit V.

Then, the photographer will turn on the one of the control switches MSW1 to MSW5 of the analogue switches which corresponds to a channel in which a sound is desired to be recorded. For example, when a sound for the high brightness warning is desired to be recorded, the MSW1 is turned on, while when a sound for the battery warning is desired to be recorded, the MSW4 is turned on.

Then, the recording switch RSW is closed to turn on the transistor 53 which causes the motor 55 to start to move along with the start of rotation of the endless tape 60. At the same time, the sound recording change over switch RSKW is connected to the fixed contact RKSWb so that it is made possible to monitor the recorded sound through the speaker SP or earphone EP, and the switches SW1 and SW2 are closed so that it is made possible to perform the erasing and sound recording operation. In this state, while looking at the mechanical counter 62A, the sound recording operator may record a sound of one word in one revolution of the endless tape 60. After the recording has been completed, he has to turn off the recording switch RSW to stop the motor 55 along with the endless tape 60.

Figure 7:
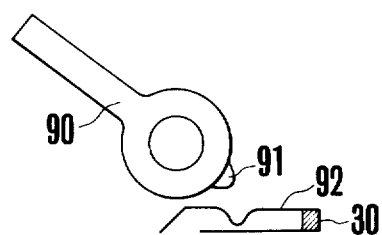
FIGS. 7 and 8 are schematic views showing a practical example of a mechanical switch 30 shown in FIG. 6, with FIG. 7 showing the application to detect the self-timer operation, and FIG. 8 showing the application to detect whether or not the film is loaded.
Figure 8:
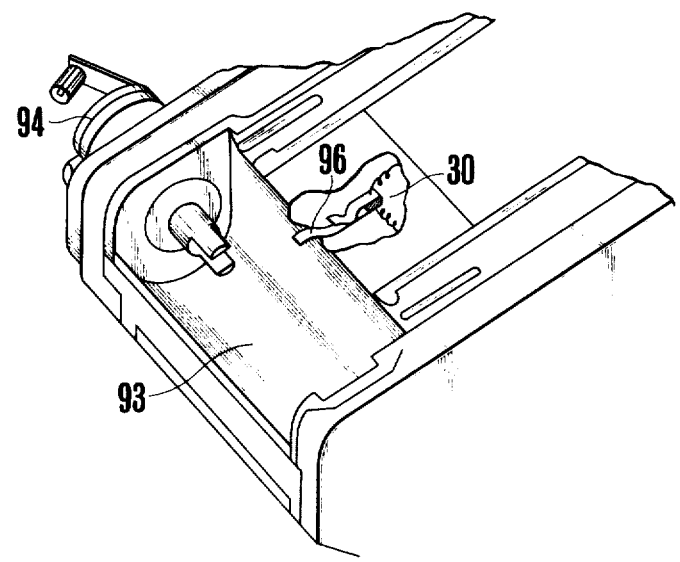

FIGS. 7 and 8 are schematic views showing two examples of application of the mechanical switch indicated at 30 in FIG. 6. In FIG. 7, the above mentioned switch 30 is arranged to be closed at the last stage of the self-timer operation, so that when said switch 30 is closed, the speaker SP or earphone EP produces a sound of "it is time to release", for example, at the terminal end of operation of the self-timer. In the FIG. 90 is a self-timer lever; 91 is a projection provided on said self-timer lever; 92 is a contact of the switch 30. During the time of operation of the self-timer, the above-mentioned self-timer lever 90 is going to turn in a clockwise direction and at the last stage of that operation the above-mentioned contact 92 is pressed by the above-mentioned projection 91, thereby the switch 30 is closed. In response to this, the OR gate 32 of FIG. 6 produces the tape start signal TSS. Subsequent operation proceeds in a similar manner to the above. Just before the self-timer operation is completed, the photographer is aware by the sound of the fact that the self-timer operation nears the terminal end, provided that the sound, say, "it is time to release" was previously recorded in the fifth channel of the endless tape.

In FIG. 8, the above-mentioned switch 30 is arranged to be closed when a film is unloaded, thereby the photographer is apprised by the sound of whether or not the film is loaded in the camera. In FIG. 8, 93 is a film cartridge chamber; 94 is a rewinding crank; 96 is a contact of the above-mentioned switch 30. In the film cartridge unloaded state, said switch 30 is closed. When the film cartridge (not shown) is loaded, the contact 96 is moved downward by the film cartridge, thereby the switch 30 is opened.

In the case of the film being unloaded, therefore, the switch 30 is closed and the above mentioned procedure takes place so that the photographer is apprised by the sound of the fact that a film cartridge is not loaded yet, provided that the sound, say, "load film", for example, was previously recorded in the fifth channel of the endless tape 60.

Figure 11:
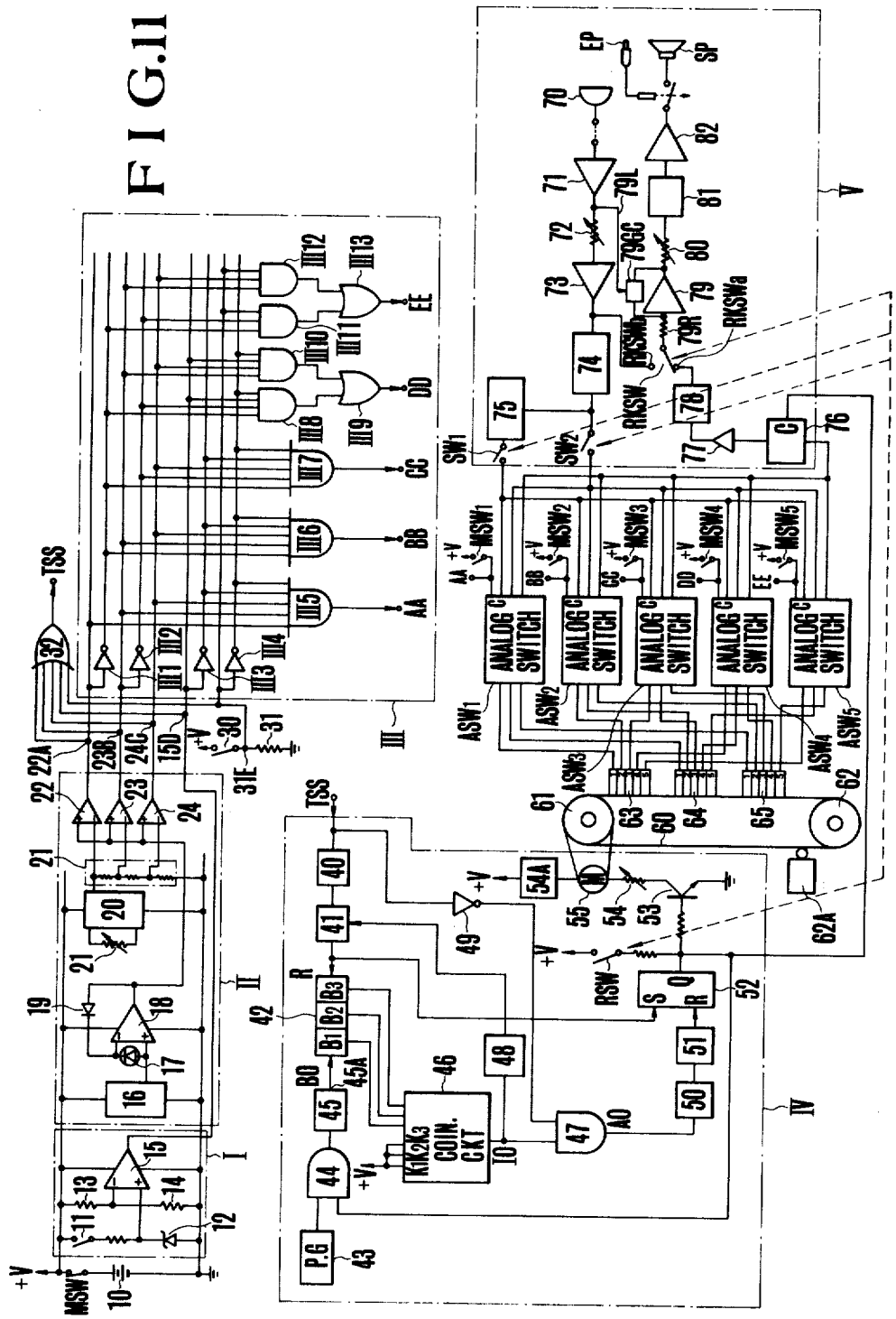
FIG. 11 is a circuit diagram showing a fourth embodiment of the present invention.

FIG. 11 shows another embodiment of the invention which is almost the same as that shown in FIG. 6, differing therefrom only in that the amplifier 79 of FIG. 6 is formed by an operational amplifier, and an input resistor 79R is connected between the input terminal of said operational amplifier and the switch RKSW, and an impedance variable element 79GC is connected in the feedback path of that operational amplifier 79 and is controlled by the output of the amplifier 71.

The operation of this embodiment is as follows: When the environmental sound is high in sound reproducing, that environmental sound is detected by the microphone 70 and amplified by the amplifier 71. Therefore, the impedance of the impedance variable element 79G which functions as the sound volume automatic adjuster is increased with increase in the gain, of the amplifier 79. Thus, the warning sound with a magnitude proportional to the environmental sound is produced from the speaker or earphone.

Conversely, when the environmental sound is low, the impedance of the impedance variable element 79GC is decreased in proportion to the environmental sound. Thus, a warning sound with a magnitude proportional to the environmental sound is produced from the speaker SP or earphone EP.

Therefore, the photographer can hear the warning sound when in a noisy environment, and in a quiet place.

The remaining operation is the same as that described in connection with the FIG. 6 embodiment, and therefore is omitted here.

Figure 12:
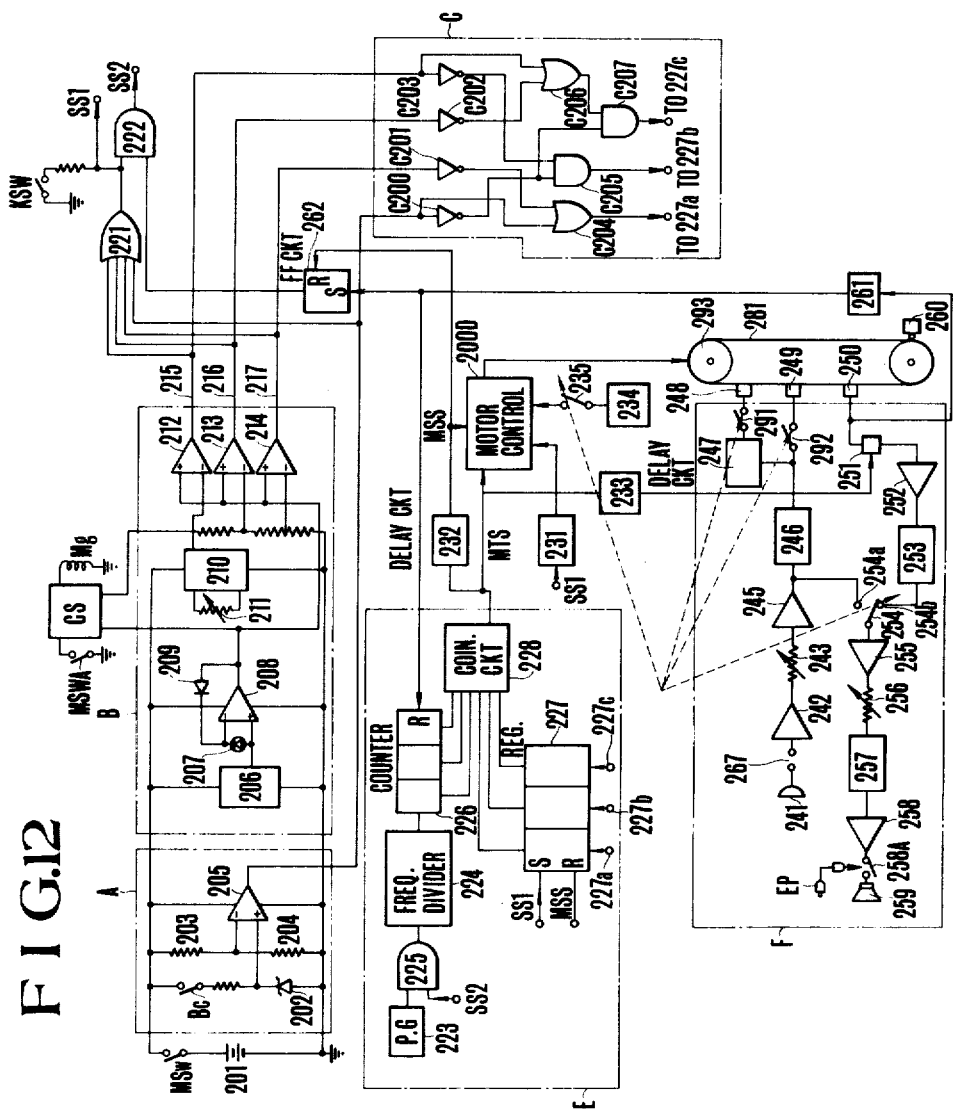
FIG. 12 is a circuit diagram of a fifth embodiment of the present invention.

FIG. 12 shows a further embodiment of the present invention which may be outlined as follows:

(1) As the magnetic recording medium, use is made of a single-channel endless magnetic tape;

(2) The camera is of the diaphragm priority automatic exposure type, and is provided with four warning functions for high brightness warning, proper, low brightness warning and battery checking;

(3) The various sound signals are recorded on the respective assigned addresses (positions) of the tape;

(4) When at least one warning signal occurs, the above mentioned endless tape is fed rapidly; upon arriving at the address (position) where a warning sound corresponding to the above-mentioned warning signal is memorized, the above-mentioned endless tape is fed normally; in a short delay time therefrom, the sound reproducing circuit is rendered operative to reproduce the warning sound. After the tape length assigned to memorize the sound signal has been transported normally, the tape is automatically stopped;

(5) Upon occurrence of at least one warning signal when in the next exposure, the above-mentioned endless tape is rapidly fed from the stopped position explained in the above-mentioned 4th item. After that, the same procedure as that described in the 4th item takes place to produce the warning sound;

(6) As has been mentioned regarding 4th item, when the tape arrives at the address assigned to the warning sound at a point in time during the fast feeding of the tape, the speed of the tape is changed from the fast to the normal speed;

(7) The method of recording sounds is based on the following: Since the warning sound must be recorded in the assigned position, according to the present invention, there is provided a mechanical counter cooperative with a film feeder to enable the photographer to record the warning sounds on the assigned positions of the tape while looking at the counter; and (8) An inhibiting switch is provided for inhibiting production of the sound output.

In FIG. 12, A circuit block enclosed enclosed by dashed lines A is a battery checking circuit; a circuit enclosed by dashed lines B is a light measuring and exposure warning signal forming circuit; a circuit enclosed by dashed lines C is a converting circuit for converting a warning signal to a 3-bit digital signal; 200D is a motor control circuit for driving the endless tape; a circuit enclosed by dashed lines E is a circuit for producing a reproduction start signal of the sound signal; a circuit enclosed by dashed lines F is a sound recording and reproducing circuit; MSW is a main switch; 201 is an electrical power source or battery; SS1 is a film rapid feeding start signal; SS2 is a count start signal.

In the following, the constructions of the various circuit portions will be explained in detail. In the battery checking circuit A, BC is a switch which is opened and closed in cooperation with a battery checker button (not shown); 202 is a Zener diode for setting a reference voltage; 203 and 204 are resistors for dividing the voltage of the battery 201; 205 is a comparing circuit, the comparing circuit 205 producing a signal of "1" when the voltage of the battery is lower than the reference level. In the light measuring and exposure warning signal forming circuit B, 206 is a reference voltage source; 207 is a photo-electric element for light measurement; 208 is an operational amplifier for amplifying the output of the photoelectric element 207; 209 is a logarithmic compression diode for logarithmically compressing the short current of 207 to cause the output of its operational amplifier 208 to vary in accordance with the logarithm of the incident light; 210 is a reference voltage source; 211 is an information input resistor for electrically introducing information of film speed value and diaphragm size value, the output of the above-mentioned voltage source 210 being varied by the information input resistor 211; CS is a shutter rear curtain control circuit known in the art; Mg is a magnet controlling the shutter rear curtain; MSWA is a normally open switch which is closed when a shutter release button is depressed; 212, 213 and 214 are comparing circuits; at the output terminals 215, 216 and 217 of the circuit B, there appear signals [1,1,1], [0,1,1] and [0,0,1], respectively, when the brightness is high, proper and low; 221 is an OR gate for producing the tape rapid feeding start signal SS1 when at least one of the above-mentioned battery checker and exposure warning or indicating signals occurs; KSW is an inhibiting switch for inhibiting production of the sound output when the photographer does not desire to have the sound, with the inhibiting switch being normally open; 222 is an AND gate for producing a count start signal SS2 when both of the tape rapid feeding start signal SS1 and a SPS signal (to be described later) representative of that fact that the tape has come to the start position become "1".

Figures 13, 14:
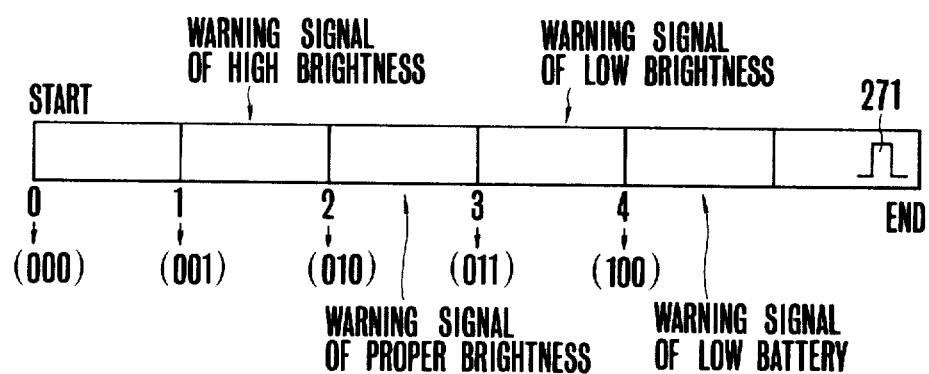
FIG. 13 is a table explaining input output relations of the logic circuit C in FIG. 12.
FIG. 14 is a view showing an example of a recording address of an endless tape in FIG. 12.

The converting circuit C performs signal conversion as shown in the input output relation diagrams of FIG. 13. For example, in the right side section, the output [001] is a signal representative of an address of the tape in which the warning signal of the high brightness warning is memorized. Likewise, [010] is a signal representative of an address of the tape in which an indication sound of proper brightness is memorized, [011] is a signal representative of an address of the tape in which a sound of low brightness warning is memorized; and [100] is a signal representative of an address of the tape in which a warning signal of abnormal battery is memorized.

As shown in FIG. 13, when two warning signals occur simultaneously, the order of the individual signals is as follows: because of the construction of the comparing circuits 212, 213 and 214 of this embodiment, the high brightness warning signal is of the highest priority, being followed in order by the proper, and next by the low brightness warning. In contrast to these signals, the abnormal battery warning is of the top priority.

Next, in the reproduction start signal forming circuit E, 223 is a clock pulse generating circuit; 224 is a frequency divider; 225 is an AND gate for initiating count in synchronism with the above mentioned count start signal SS2; 226 is a 3-bit counter; 227 is a 3-bit register which is set by the motor rapid feeding start signal SS1 to memorize input signals applied to the input terminals 227a, 227b and 227c thereof, and which is reset by the motor stop signal MSS; 228 is a coincidence circuit of known construction in the art for producing an MTS signal when the output signals of the individual bits of the above-mentioned counter 226 and register 227 coincide with each other. When the signal MTS is fed to the motor control circuit 200D, the rapid feeding operation is changed to the normal feeding operation.

231 is a mono-stable multivibrator responsive to the above-mentioned tape rapid feeding signal SS1 for producing a pulse signal which is applied to the motor control sircuit 200D to start the tape rapid feeding operation; 234 is a tape normal feeding signal forming circuit; 235 is a switch cooperative with a sound recording-reproducing change over switch 254 which will be described later in such a manner that when said change over switch 254 is changed over to the sound recording position, it is closed.

232 is a delay circuit for producing a tape movement stop signal MSS which is applied to the motor control circuit 200D after a predetermined time from the start of the above-mentioned normal feeding operation.

233 is a delay circuit for producing an ON signal which is applied to a switch circuit 251 of a reproducing circuit which will be described later after somewhat of a delay from the above-mentioned motor normal feeding signal MTS.

Next in the sound recording and reproducing circuit F, 241 is a sound recording microphone; 242 is an amplifier; 243 is a sound volume adjuster; 245 is an amplifier; 246 is an equalizer; 247 is a high frequency wave oscillator; 248 is an erasing head; 249 is a sound recording head; 250 is a reproducing head; 251 is the above-mentioned switching circuit receptive of the motor normal feeding signal MTS through the delay circuit 233 for turning on the reproducing circuit; 252 is an amplifier; 253 is an equalizer; 254 is a sound recording-reproducing change over switch when set in a fixed contact 254a position to select the sound recording mode whereby the monitor can be made in synchronism with the sound recording through the speaker SP or earphone EP, and when set in a fixed contact 254b position to select the reproduction mode; 291 and 292 are switches cooperative with the above-mentioned sound recording-reproducing change over switch upon setting to the sound recording position to be closed. Further, when this change over switch 254 is set to the position 254a for the sound recording mode, the above-mentioned switch 235 is closed to give to the motor control circuit 200D a signal of the tape normal feeding signal forming circuit 234, so that the tape is fed normally. 255 is an amplifier; 256 is a sound volume adjuster; 257 is a sound quality adjuster; 258 is an amplifier; 258A is a change over switch which is normally closed, but which is opened by the insertion of the earphone EP; 259 is a speaker. Further, 281 is an endless tape; 260 is a mechanical counter which will be described later; and 293 is a tape driving motor.

FIG. 14 is a view showing an example of arrangement of recording addresses on an endless tape 281 used in the device of FIG. 12. The various warning sounds are recorded in this order on assigned positions. Further, a pulse wave of steep hight shown at 271 in FIG. 14 is previously recorded in the last portion of the tape. The reset signal for the counter 226 and the count start signal SS2 are formed by detecting this pulse 271. 261 is a differentiation circuit for differentiating this pulse wave 271, and the output of this differentiation circuit resets the counter 226. Further, the output of this differentiation circuit is applied to the "set" input terminal of the RS flip-flop circuit 262 (see FIG. 12), and its output and the tape rapid feeding signal SS1 are applied to an AND gate 222 having an output which serves as the count start signal SS2. Further, this RS flip-flop circuit 262 is reset by the above-mentioned motor stop signal MSS. The differentiation circuit 261 is so constructed that only when the above-mentioned pulse waveform 271 enters, there is produced an output signal effective enough to reset the counter 226 and to set the RS flip-flop 262. The other sound signals on the magnetic tape can not reset the counter 226 and set the RS flip-flop 262.

Figure 15:
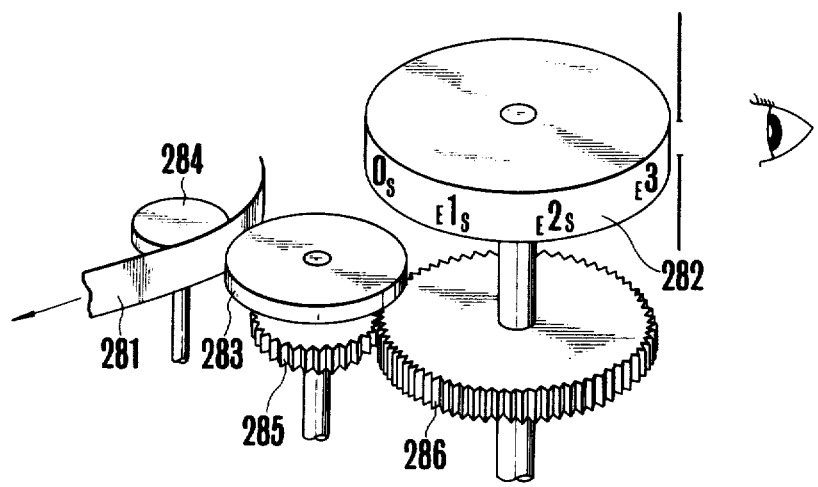
FIG. 15 is a construction view showing an example of the application of a mechanical type counter 260 in the device shown in FIG. 12.

FIG. 15 is a structural view showing a practical construction of the above-mentioned mechanical counter 260. In the FIG. 281 is the above-mentioned endless tape; 282 is a counter disc calibrated in a counter scale; 283 is a transmission roller (capstan) for transmitting motion of the tape to the counter disc; 284 is a roller (pinch roller) for pressing the tape 281 against the transmission roller 283; 285 is a transmission gear coaxially rotatable with the above-mentioned transmission roller 283; 286 is a gear coaxially rotatable with the above-mentioned counter disc 282 and meshing with the above-mentioned transmission gear 285.

The speed reduction ratio and phase of these transmission gears 285 and 286 are so adjusted that during the time when the endless tape 281 moves from the start position shown in FIG. 14 to the END position, the counter disc 82 rotates one revolution from a [0] position again to the [0] position. It is noted that this mechanical counter may be used as 62A of the above-mentioned embodiment.

It is further noted that all the circuit portions shown in FIG. 12 are brought into connection with the electrical power source when the main switch MSW is closed.

Next, the operation of the circuit shown in FIG. 12 will be explained. At first, in the case of recording warning sounds, the main switch MSW is closed, and then the above-mentioned sound recording-reproducing change-over switch 254 is connected to 254a side, thereby the switches 291 and 292 are closed. By this, the sound recording circuit is rendered operative, and at the same time the above-mentioned switch 235 is closed, causing the tape normal feeding signal forming circuit 234 to produce the tape normal feeding signal which is applied to the motor control circuit 200D. Thus, the tape is fed normally, while the memorized signal on the tape is erased by the erasing head 248 to enable sound recording. As the tape is fed normally, the above-mentioned mechanical counter 260 starts to move. Therefore, the user looking at the counter disc 282 records a sound for the high brightness warning from the time when a scale graduation [1] is read out, then a sound for the proper indication from the time when a scale graduation [2] is read out, then a sound for the low brightness warning from the time when a scale graduation [3] is read out, and then a sound for the abnormal battery voltage from the time when a graduation [4] is read out. After the sound recording has been completed, the sound recording-reproducing change over switch is changed over to the 254b side, thereupon the above-mentioned switch 235 is opened to cut off the normal feeding signal and to stop the tape movement. Also the switches 291 and 292 are opened so that the sound recording becomes impossible. Thereafter, the main switch MSW is opened to terminate the sound recording operation.

Next, the warning sound reproducing operation will be explained. When the main switch MSW is closed, the light measuring circuit starts to operate. If the circuit B produces the high brightness warning signal, as the sound recording and reproducing change over switch 254 is set in the 254b side at this time, a signal of [1,1,1] appears at the terminals 215, 216 and 217. This signal is converted by the converting circuit C with the OR gates C204 and C205 producing outputs both of which are "0", and with the AND gate C207 producing a "1" output. (see FIG. 13, in this case, the battery abnormal warning signal produced from the comparing circuit 205 is "0").

This signal is memorized in the register 227 as a signal indicating that address of the tape 281 which stores the warning sound for the high brightness warning.

In synchronism with this, the OR gate 221 sends the tape rapid feeding signal SS1 to the mono-stable multivibrator 231 whose output pulse signal is fed to the motor control circuit 200D, so that a tape rapid feeding operation is initiated. As the tape 281 comes to the END position shown in FIG. 14, when the pulse signal 271 is detected by the reproducing head 250, a very steep differentiation waveform apears at the output of the differentiation circuit 261 and rests the counter 226. At the same time, the RS flip-flop circuit 262 is set, causing the AND gate 22 to produce the count start signal SS2 as the above-mentioned tape rapid feeding signal SS1 and the output signal of the RS flip-flop circuit 262 are applied to the inputs of the AND gate 222.

By this count start signal SS2, the AND gate 225 is opened to pass the clock pulse signal to the frequency divider 224 therethrough. Since the counter 226 is reset when the tape reaches the END position as has been mentioned above, the counting starts from the START position of the tape. The frequency divider 224 is designed by taking into account the speed of the tape 281 so that when the tape 281 comes to the [1] position, a first pulse is produced. Then, the tape 281 comes to the [2] position where a second pulse is produced, then to the [3] position where a third pulse is produced, and so on.

Now, we have the content of the register 227 as memorizing [001]. Therefore, when the tape comes to the [1] position at which the content of the counter 226 becomes [001], the individual bit outputs of the register 227 coincide with the individual bit outputs of the counter 226, causing the coincidence circuit 228 to produce the moderate tape running signal MTS and therefore causing the tape 281 to change from the so far rapid running to the moderate running. This moderate tape speed signal MTS after somewhat delayed by the delay circuit 233 is applied to the switching circuit 251 of the reproducing circuit. Thus, the reproducing operation of the warning sound is initiated with the speaker 259 producing the warning sound for the high brightness warning of the tape, and the photographer is apprised by the sound of the fact that the object brightness is high.

The reason for providing the delay circuit is that the stabilization of the tape speed when changed from the rapid running to the moderate running takes some time.

Then, the tape 281 nears the [2] position of FIG. 14 where the delay circuit 232 produces the motor stop signal MSS and the tape is caused to stop. In synchronism with this, the above-mentioned RS flip-flop circuit 262 is reset. Further, at the same time, the content of the register 227 is cleared up by the motor stop signal MSS.

Next, for example, when the battery abnormal warning signal occurs, the above-mentioned sound warning reproducing operation repeats itself. Further, for example, in the quiet place such as in the theater, it is undesirable to produce the sound output. Then the inhibiting switch KSW is turned on so that the rapid tape running signal SS1 is always "0". Therefore, even when at least one input of the OR gate becomes "1", the sequence that follows the rapid tape running is not proceed, and the sound output is not produced.

Figure 16:
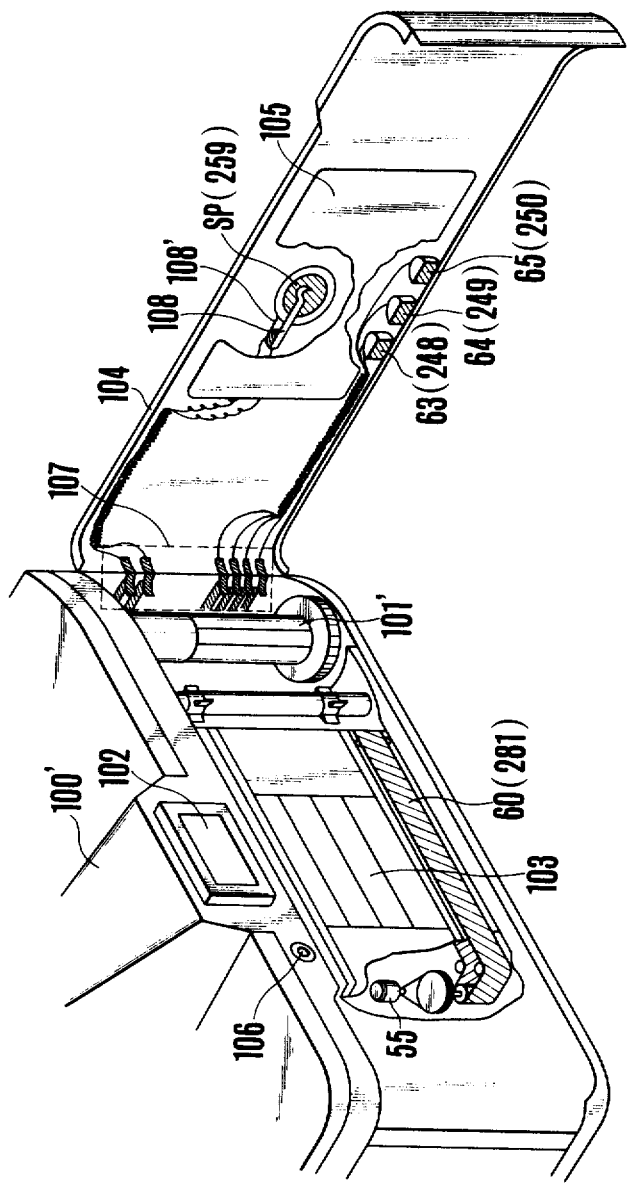
FIG. 16 is a view of the main mechanical parts of a sixth embodiment of the present invention.

Next, a further embodiment of the sound producing device according to the present invention incorporated in a still camera is shown in FIG. 16. This embodiment utilizes a structure such that the magnetic tape of the sound producing device is positioned below the picture framing member of the camera body.

In the following, the parts parenthesized denote the same parts as those shown in FIG. 15. In FIG. 16, 60(281) is the above-mentioned magnetic tape; 100' is a penta prism cover of the single lens reflex camera; 101' is a take-up spool; 102 is an eye-piece of a finder optical system; 103 is a longitudinally running type focal plane shutter; 104 is a back cover; 105 is a pressure plate; 106 is a jack to which a microphone is inserted when in sound recording; 63(248), 64(249) and 65(250) are the above-mentioned erasing, sound recording and reproducing heads fixed to the above-mentioned back cover 104; SP(259) is a speaker for the above-mentioned reproduction positioned on the back side of the pressure plate 105 and constructed in the plate type condenser form; 108 and 108' are contact electrodes contacting with said condenser speaker; 107 represents electrode connectors connecting the above-mentioned head groups 63(248), 64(249) and 65(250) and the speaker SP(259) with driving circuit contained within the camera body upon closure of the back cover to conduct the individual connectors; 55 is a motor for driving the above-mentioned magnetic tape 60(281).

As shown in the above, the present embodiment arranges the magnetic tape 60(281) below the picture image framing member of the camera body, and the magnetic head and speaker on the back cover 104. In such arrangement, when the back cover 104 is closed, the connectors 107 conduct, and the head groups 63(248), 64(249) and 65(250) are brought into contact with the above-mentioned magnetic tape 60(281), thereby the sound recording and reproducing operation is made possible. It is noted that in this embodiment the sound recording microphone is used in insertion into the jack 104 and is not incorporated in the camera. Further the driving control circuit shown in FIG. 6 or FIG. 12 is constructed in the IC form and is contained in the penta prism portion or below the camera body.

Figure 17:
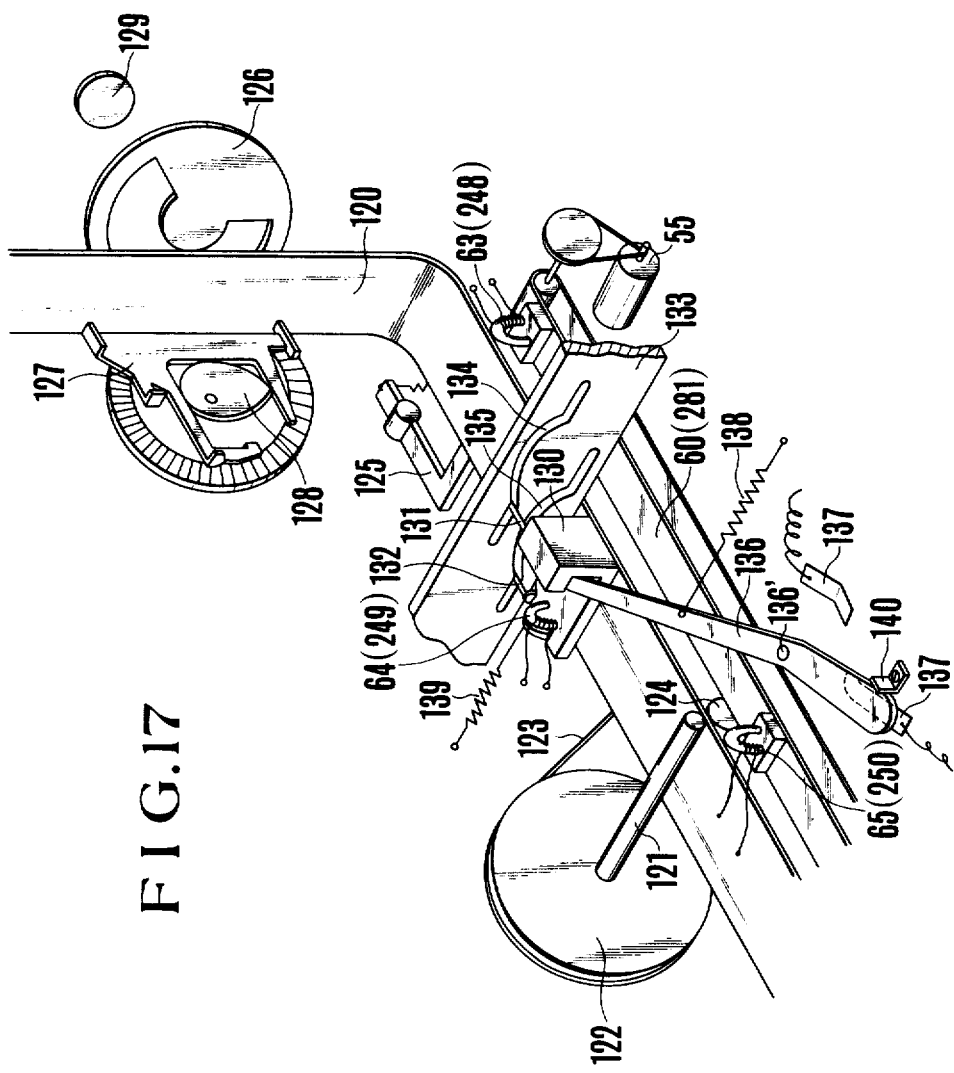

Next, a further embodiment of the sound producing device according to the present invention incorporated in a 8 m/m sound motion picture camera is shown in FIGS. 17 and 18. In this embodiment, the synchronous sound recording magnetic head and amplifier of the 8 m/m sound motion picture camera serve as the sound recording head and amplifier of the above mentioned sound producing device. Thus, an increase in the complexity and bulk of the camera structure which would be otherwise caused by incorporating the sound producing device is prevented.

In FIG. 17, 120 is a sound 8 m/m film known in the art having a magnetic sound recording track; 121 is a capstan which functions to move the above-mentioned film at a constant speed; 122 is a fly wheel coaxially fixed to the above-mentioned capstan and which functions to rotate the above-mentioned capstan 121 stably and at a constant speed; 123 is a belt for transmitting motion of a motor (not shown) to the fly wheel 122; 124 is a pinch roller on the opposite side of the film 120 to the above-mentioned capstan 121; 125 is a loop senser for sensing a slack loop of the above-mentioned sound 8 m/m film 120, the output of the loop senser controlling the speed of movement of a feeding pawl 127 which will be described later so that the slack of the sound 8 m/m film is removed; 126 is a shutter making rotative movement; 128 is a triangular cam making synchronous rotative movement with said shutter 126, 127 is a feeding claw reciprocating up and down by the rotative movement of said triangular cam 128.

63(248) is an erasing head for the above-mentioned magnetic tape 60(281); 64(249) is a sound recording magnetic head usable in either of the recording operations of the sound 8 m/m film and the magnetic tape 60(281) of the sound device.

130 is a stationary support to which said sound recording magnetic head 64(249) is fixed; 131 and 132 are guide pins provided on said support.

133 is a stationary plate fixed to the camera body, said stationary plate being provided with arcuate slots 134 and 135 in which the above-mentioned guide pins 131 and 132 are engaged; 136 is a pivotal lever with a rotation center at an axis 136', its end being engaged with the support 130 of the above-mentioned sound recording head.

138 is a spring urging said pivot lever 136 to rotate in a clockwise direction; 139 is a spring urging said stationary support 139 to move to the left, the spring 139 being stronger than the spring 138 so that the above-mentioned support 130 and pivotal lever 136 are normally in a position shown in FIG. 17; 140 is a stopper for preventing further movement of the pivotal lever 136; 137 is an electric electrode of a jack which is connected with a plug of a sound recording microphone when it is inserted.

FIG. 17 shows a state where the sound recording magnetic head 64(249) performs a synchronous sound recording on the sound 8 m/m film.

At this time, the sound 8 m/m film 120 is moved to the left by the rotative motion of the capstan 121 and the feeding claw 127, and the environmental sound and voice of a scene to be photographed are synchronously recorded on the magnetic recording track provided along the side edge of the sound 8 m/m film by the sound recording magnetic head 64(249). The remaining parts such as the shutter 126 operate in manner well known in the art, and therefore their explanation is omitted here.

Next, the operation when sounds such as warning sounds are recorded on the magnetic tape 60(281) of the sound device will be explained.

In this embodiment, when the plug of the sound recording microphone is inserted, the above-mentioned sound recording magnetic head 64(249) is moved onto the magnetic tape 60(281) of the sound device. In other words, as shown in FIG. 18, when the sound recording microphone plug 141 is inserted, the above mentioned rotative lever 136 is turned about the shaft 136' in the clockwise direction by the end terminal of the plug 141, and the support for the magnetic head 64(249) is moved onto the magnetic tape 60(281) as is guided by the guide slots 134 and 135 of the stationary plate 133. In this state, the photographer records sounds such as warning sounds by arbitrary sounds.

Figure 19:
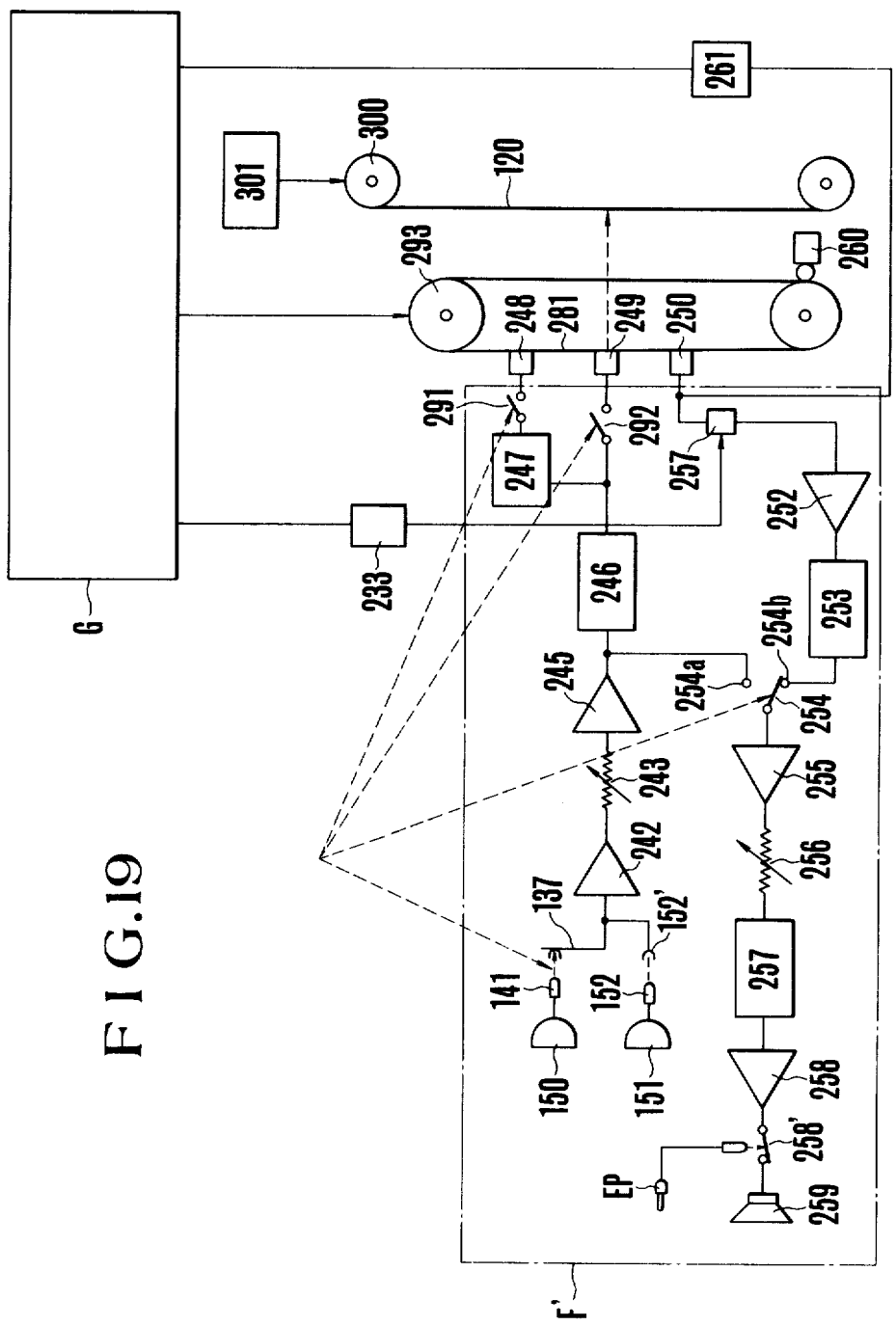
FIG. 19 is a circuit diagram showing a practical example of the reproducing circuit in the device shown in FIGS. 17 and 18.

FIG. 19 is a circuit diagram showing an example of a sound recording and reproducing circuit in the device of FIG. 17 and FIG. 18. In the figure, F' is almost the same as the sound recording and reproducing circuit F of FIG. 12, but the input of the sound recording amplifier 242 is receptive of both of the microphone for the sound recording and the microphone 151 for synchronous sound recording on the sound 8 m/m film; 141 is the above-mentioned sound recording microphone plug; 152 is a plug of a microphone for the synchronous sound recording on the sound 8 m/m film; 137 is an electrical electrode connected to the plug of the above-mentioned sound recording microphone; 152' is an electrode connected to the plug 152 of the microphone for the synchronous sound recording and arranged in a separate plate (not shown) from the above mentioned electrode 137.

Further, when the plug 141 of the microphone for the sound recording is inserted, the change over switch 254 is changed over from the fixed contact 254b side to the fixed contact 254a side, and the switches 291 and 292 are closed. The sound recording magnetic head 249 also is moved from the above of the sound 8 m/m film 120 to the above of the magnetic tape 281. 120 is the above-mentioned sound 8 m/m film; 249 is a sound recording head for use in either of the warning sound recording and the synchronous sound recording. Other elements denoted by the same numerals as those enclosed by the dashed lines F of FIG. 12 are the similar constitutional parts to the elements shown in FIG. 12. Further, G indicates the other circuit portion (see FIG. 12) than F of FIG. 12. 300 is a motor for driving the above-mentioned capstan 121; and 301 is a control circuit for said motor 300.

The operation of the sound recording-reproducing circuit of such construction as shown above is almost the same as that of the sound recording-reproducing circuit shown in FIG. 12. Therefore, the explanation is omitted here.

As has been described above, the sound recording-reproducing circuit of FIG. 19 makes use of the circuit of FIG. 12, but it is, of course, possible to use that of FIG. 6.

In the above mentioned embodiments, as the power source of driving the endless tape use is made only of an electric motor. It is possible to utilize the charging force of a coil spring as the power source for driving the endless tape.

Figure 20:
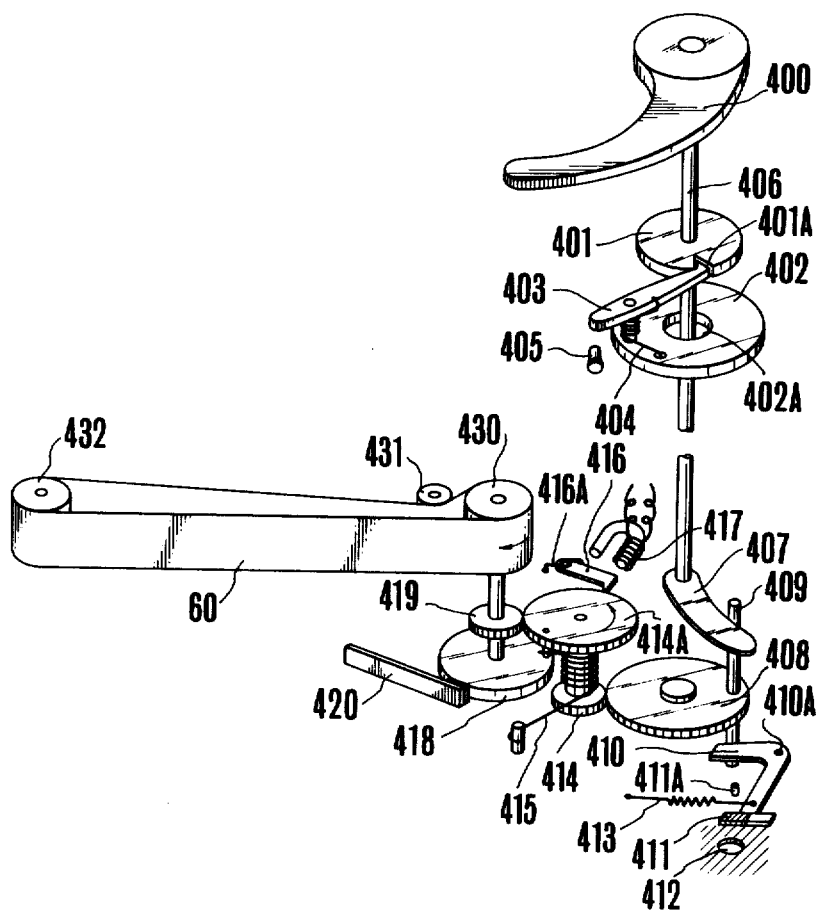
FIG. 20 is a view showing the mechanical parts of an eighth embodiment of the present invention.

FIG. 20 is a structural view showing another embodiment of the invention using this charging force. In this embodiment the coil spring is charged by film winding in a still camera, and the endless tape is driven to rotate by its force. It is noted that this embodiment is incapable of recording sounds, and therefore there is need for the camera to contain an endless tape on which the sounds were previously recorded.

In FIG. 20, 400 is a winding up lever; 401 is a disc coaxially rotatable with said winding lever 400 and provided with a recess 401A; 402 is a disc cooperative with a film winding up mechanism (not shown), said disc 402 being provided with a hole 402A at the center thereof. On said disc 402 is pivoted a lever 403 whose end is engaged with the recess 401A of the above-mentioned disc 401 as a spring 404 urges it to rotate in a counter-clockwise direction 405 is a multi-exposure button upon depression to permit clockwise movement of the above-mentioned lever 403, so that said lever 403 is disengaged from the above-mentioned disc 401. Therefore, at this time, even when the winding lever 400 is cocked, the film winding mechanism remains inoperative to permit a multi-exposure.

407 is a lever for winding up a coil spring fixed to the bottom end of the above-mentioned shaft 406; 408 is a gear to which a pin 409 is fixed, said pin 409 abutting against the above-mentioned coil spring winding lever 407.

410 is an L-shape lever rotatable about the shaft 410A, one end of which is engaged with the above mentioned pin 409 and the opposite end of which is provided with a red mark 411 indicating the charge state of the coil spring. In a position (illustrated in FIG. 20) where said red mark can be viewed through a display window 412, the charge force of the coil spring is shown to be lost. Further, said L-shape lever is urged by a spring 413 to rotate in a clockwise direction; 414 is a gear meshing with the above-mentioned gear 408; a gear 414A coaxially rotates with the above-mentioned gear 414, said gear 414A being urged by a coil spring 415 to rotate in a counter-clockwise direction; 416 is a stop lever upon engagement with the above mentioned gear 414A to inhibit counterclockwise rotation of the gear 414A, said stop lever 416 being urged by a spring 416A to always rotate in a clockwise direction; 417 is a magnet for attraction of the stop lever 416; 419 is a gear engaging with the above-mentioned gear 414A, said gear, a disc 418 and a roller 430 being coaxial to one another; 420 is a brush contacting the disc 418, so that the disc 418 rotates stably at a slow speed by the frictional force of said brush 420; 60 is the above-mentioned 5-channel endless tape; 432 is a roller for guiding said endless tape 60. Further the above mentioned magnet 417 is connected in place of the transistor 53 which is connected to the output Q of the RS flip-flop circuit 52 of the driving circuit shown in FIG. 6.

The operation of the endless tape driving coil spring mechanism of FIG. 12 as applied to the device shown in FIG. 6 will next be explained.

At first, when the winding lever is cocked, the above-mentioned coil spring winding-up lever 407 is turned in the counter-clockwise direction, thereby the gear 408 is turned in the counter-clockwise direction and the gears 414 and 414A are turned in the clockwise direction to charge the coil spring 415. After the winding-up lever 400 is rotated by a predetermined angle, when it is returned, the winding-up lever 400 can be returned to the initial position, but the gear 414A is stopped in that position by engagement with the stop lever 416. Therefore, the gear 408 and the endless tape 60 stop in that position. At this time, the L-shape lever 410 rotates until a position of the stopper 411A by the spring 413, and therefore the red mark 411 can not be viewed through the display window 412, indicating that the coil spring is charged.

Here, when the tape start signal TSS (see FIG. 6) from the camera body side is produced, as has been mentioned in FIG. 6, the output Q of the RS flip-flop circuit 52 becomes "1" to cause the magnet 417 to attract the stop lever 416, thereupon the gear 414A starts to rotate under the action of the charge force of the coil spring 415. Thus, the endless tape 60 also rotates in the clockwise direction to perform the sound reproducing operation mentioned in FIG. 6.

Next, when the tape start signal TSS becomes "0", the output Q of the above-mentioned RS flip-flop circuit 52 (see FIG. 6) becomes "0" (in practice, however, these do not become "0" simultaneously as described in detail in FIG. 6), and the attraction force of the magnet 417 disappears so that the stop lever 416 is rotated in the clockwise direction by the bias force of the spring 416A upon engagement with the gear 414A to stop rotation of the gear 414A. Thus, the endless tape also stops. As the charge force of the coil spring 415 is lost, when the gear 408 rotates to a position illustrated in FIG. 20, the pin 409 drives the L-shape lever 410 to rotate in the counter-clockwise direction against the force of the spring 413. Thus, the red mark 411 can be viewed through the display window 412, indicating that the charge force of the coil spring 415 is lost.

Again, in order to charge the coil spring 415 without winding up the film, while the multi-exposure button 405 is depressed and held in, the winding up lever 400 may be cocked. With the multi-exposure button 405 depressed, the lever 403 is turned in the clockwise direction against the bias force of the spring 404 so that said lever is disengaged from the recess 401A of the disc 401 to disconnect the disc 402 from the disc 401. Therefore, at this time, the winding up operation of the lever 400 leads to charge the coil spring 415 without causing the film to be wound up.

As has been explained in detail based on the various embodiments, in the sound producing device incorporated camera of the invention, when the condition of the object to be photographed has a high brightness, proper or low brightness, or when the self-timer is used, the warning display to the photographer can be made by the use of practical language transmitted to the photographer by sound, thereby it is made possible to prevent these warning displays from being overlooked when in taking pictures and incorrect exposure from being made.

Further, in the above embodiment, for the language recording device, the use of a PROM or endless tape is examplified, but the present invention is not confined thereto, and a magnetic disc as one of the magnetic recording media may be used as well.

What is claimed is:

1. A photographic camera comprising:
  (a) warning signal source means for generating a first warning signal indicating an abnormal exposure value, and a second warning signal indicating an abnormal condition of a power source circuit;
  (b) priority means connected to the warning signal source means to generate an electrical signal corresponding to the warning signals applied from the warning signal source means, said priority means being designed to generate preferentially the second warning signal when the two warning signals are simultaneously generated from the warning signal source means; and
  (c) sound producing means functionally connected to the priority means for converting the electrical signal from the priority means to an audible signal.

2. A photographic camera according to claim 1, wherein said priority means includes a priority encoder having an input terminal connected to the warning signal source means and an output terminal and a decoder having an input terminal connected to the output terminal of said priority encoder.

3. A photographic camera according to claim 2, wherein said priority encoder has a plurality of input terminals of which respective terminals receive a signals corresponding to the warning signals from said warning signal source means.

4. A photographic camera according to claim 1, wherein said sound producing means includes a memory chip to store a plurality of the warning signals and a speaker operatively connected to the memory chip.

5. A photographic camera according to claim 4, wherein said memory chip includes at least one read-only memory.

6. A photographic camera according to claim 5, wherein said read-only memory is a programmable read-only memory.

7. A photographic camera according to claim 1, wherein said priority means includes a logic circuit having input terminals and output terminals.

8. A photographic camera according to claim 1, wherein said sound producing means includes a magnetic recording member for storing various kinds of warning signals and a speaker operatively connected to the magnetic recording member.

9. A photographic camera comprising:
(a) warning signal source means for generating a first signal warning indicating an abnormal exposure value and a second warning signal indicating that a film is not charged;
(b) priority means connected to the warning signal source means to generate an electrical signal corresponding to the warning signals applied from the warning signal source means, said priority means being designed to generate preferentially the second warning signal when the two warning signal are simultaneously generated from the warning signal source means; and
(c) sound producing means functionally connected to the priority means for converting the electrical signal from the priority means to an audible signal.

10. A photographic camera comprising:
(a) warning signal source means for generating a first warning signal indicating an abnormal condition of a power source circuit and a second warning signal indicating that a film is not charged;
(b) priority means connected to the warning signal source means to generate an electrical signal corresponding to the warning signals applied from the warning signal source means, said priority means being designed to generate preferentially the second warning signal when the two warning signals are simultaneously generated from the warning signal source means; and
(c) sound producing means functionally connected to the priority means for converting the electrical signal from the priority means to an audible signal.

* * * * *